(12) United States Patent  (10) Patent No.: US 10,123,521 B2
Castaneda et al.  (45) Date of Patent: Nov. 13, 2018

(54) SYSTEMS AND METHODS FOR AUTOMATED FISH CULLING

(71) Applicant: SPFM, L.P., San Antonio, TX (US)

(72) Inventors: Robert Castaneda, San Antonio, TX (US); Basil E. Battah, San Antonio, TX (US)

(73) Assignee: SPFM, L.P., San Antonio, TX (US)

( * ) Notice: Subject to any disclaimer, the term of this patent is extended or adjusted under 35 U.S.C. 154(b) by 146 days.

(21) Appl. No.: 14/798,382

(22) Filed: Jul. 13, 2015

(65) Prior Publication Data

US 2015/0317502 A1 Nov. 5, 2015

Related U.S. Application Data

(63) Continuation of application No. 14/798,315, filed on Jul. 13, 2015, which is a continuation-in-part of
(Continued)

(51) Int. Cl.
*A01K 85/01* (2006.01)
*A01K 65/00* (2006.01)
(Continued)

(52) U.S. Cl.
CPC .............. *A01K 85/01* (2013.01); *A01K 65/00* (2013.01); *A01K 91/06* (2013.01); *A01K 93/00* (2013.01); *A01K 93/02* (2013.01); *A01K 97/00* (2013.01); *A01K 97/20* (2013.01); *A01K 99/00* (2013.01); *G01B 7/02* (2013.01); *G01G 17/00* (2013.01); *G01G 19/415* (2013.01); *G01G 23/32* (2013.01);
(Continued)

(58) Field of Classification Search
CPC ...... A01K 61/001; A01K 61/90; A01K 65/00; A01K 85/01; A01K 89/015; A01K 91/02; A01K 91/06; A01K 91/20; A01K 93/00; A01K 93/02; A01K 97/00; A01K 97/20; A01K 97/125; A01K 99/00; G01B 7/02; G01G 17/00; G01G 19/415; G01G 19/60; G01G 23/32; G01S 5/00
See application file for complete search history.

(56) References Cited

U.S. PATENT DOCUMENTS 4,445,178 A * 4/1984 Scheer ................... A01K 97/00
  43/4
5,545,855 A * 8/1996 Stanfield ................ G01G 19/60
  177/148

(Continued)

*Primary Examiner* — Quan-Zhen Wang
*Assistant Examiner* — Stephen Burgdorf
(74) *Attorney, Agent, or Firm* — David G. Henry, Sr.

(57) ABSTRACT

An automated fish culling system which includes a base station which includes a processor and base station display for displaying information corresponding to a plurality of cull tags, the base station display being communicably coupled to the processor. Each of the plurality of cull tags are configured to be associated with a fish and includes cull tag display for identifying the cull tag. The system further includes a memory for storing data that includes information associated with the fish, the information comprising a fish weight, wherein the processor determines which fish to cull based on at least the fish weight associated with each fish, and indicates which fish to cull via at least the base station display.

27 Claims, 12 Drawing Sheets

Related U.S. Application Data application No. 14/728,781, filed on Jun. 2, 2015, which is a continuation-in-part of application No. 13/920,786, filed on Jun. 18, 2013.

(60) Provisional application No. 61/660,898, filed on Aug. 18, 2012.

(51) Int. Cl.

| | | |
|---|---|---|
| *A01K 93/00* | (2006.01) | |
| *A01K 93/02* | (2006.01) | |
| *A01K 97/00* | (2006.01) | |
| *A01K 97/20* | (2006.01) | |
| *A01K 99/00* | (2006.01) | |
| *G01B 7/02* | (2006.01) | |
| *G01G 17/00* | (2006.01) | |
| *G01G 19/415* | (2006.01) | |
| *G01G 23/32* | (2006.01) | |
| *G01S 5/00* | (2006.01) | |
| *G01S 19/13* | (2010.01) | |
| *G01S 19/14* | (2010.01) | |
| *G06K 7/10* | (2006.01) | |
| *G08B 3/10* | (2006.01) | |
| *A01K 91/06* | (2006.01) | |
| *H04R 1/02* | (2006.01) | |
| *A01K 85/16* | (2006.01) | |
| *G01G 19/60* | (2006.01) | |

(52) U.S. Cl.
CPC ............ *G01S 5/0027* (2013.01); *G01S 19/13* (2013.01); *G01S 19/14* (2013.01); *G06K 7/10366* (2013.01); *G06K 7/10415* (2013.01); *G08B 3/10* (2013.01); *H04R 1/028* (2013.01); *A01K 85/16* (2013.01); *G01G 19/60* (2013.01); *Y02A 40/86* (2018.01)

(56) References Cited

U.S. PATENT DOCUMENTS

| | | | | |
|---|---|---|---|---|
| 5,974,721 | A * | 11/1999 | Johnson | A01K 93/02 43/17 |
| 5,987,808 | A * | 11/1999 | Coles | A01K 97/00 177/245 |
| 6,133,832 | A * | 10/2000 | Winder | G08B 13/1427 340/10.4 |
| 6,222,449 | B1 * | 4/2001 | Twining | A01K 97/00 177/148 |
| 8,738,322 | B1 * | 5/2014 | Gioffre, II | G01G 5/02 702/173 |
| 2003/0127253 | A1 * | 7/2003 | Heyn | G01G 19/60 177/148 |
| 2004/0035223 | A1 * | 2/2004 | Darnell, Jr. | A01K 73/10 73/862.474 |
| 2004/0095756 | A1 * | 5/2004 | Parsons | A44B 15/00 362/196 |
| 2005/0102886 | A1 * | 5/2005 | Ball, Sr. | A01K 97/20 43/55 |
| 2011/0208479 | A1 * | 8/2011 | Chaves | A01K 97/00 702/187 |
| 2011/0220426 | A1 * | 9/2011 | Bond | A01K 77/00 177/245 |
| 2012/0291335 | A1 * | 11/2012 | Brooke | A01K 97/20 43/55 |
| 2013/0168161 | A1 * | 7/2013 | Saulters | G01G 19/60 177/25.13 |

* cited by examiner

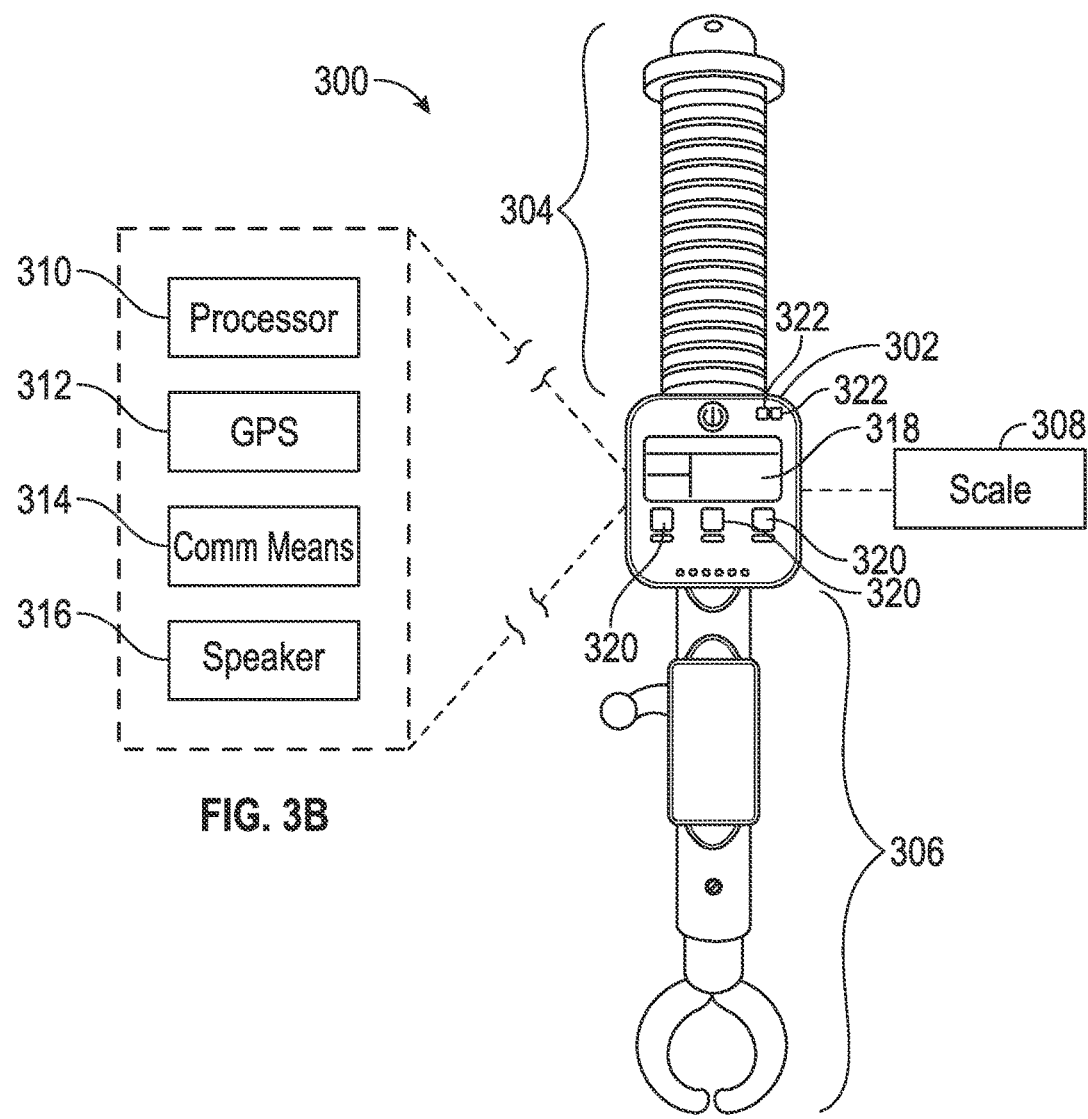

SYSTEMS AND METHODS FOR AUTOMATED FISH CULLING

STATEMENT OF PRIORITY

The present application is a continuation of U.S. Nonprovisional application Ser. No. 14/798,315, titled "Systems and Methods for Monitoring and Communicating Fishing Data" and filed Jul. 13, 2015, which is a continuation-in-part and claims priority to currently pending U.S. Nonprovisional application Ser. No. 14/728,781, titled "Multiple Mode Artificial Fishing lure" and filed on Jun. 2, 2015, which is a continuation-in-part and claims priority to currently pending U.S. Nonprovisional application Ser. No. 13/920,786, titled "Multiple Mode Artificial Fishing Lure" and filed on Jun. 18, 2013, which claims priority to U.S. Provisional Application No. 61/660,898, titled "Multiple Mode Artificial Fishing Lure," filed Jun. 18, 2012.

TECHNICAL FIELD

The present disclosure generally relates to systems and methods for automated fish culling.

BACKGROUND

Early on, mankind relied on fishing as a means of survival. However, over the years, fishing has evolved from solely a means of survival to a sport. In addition to the reasons for fishing itself having changed, so have the methods employed. While the first fisherman may have relied on rudimentary spears, nets, or even their bare hands to capture fish, today anglers heavily rely on live bait, artificial lures, and a variety of technologies to increase the likelihood of catching a fish, and increasing the size of fish caught.

Currently, there are a variety of live bait available for use, and even a much wider array of surprisingly sophisticated fishing lures available to bolster the success of any fisherman. These lures come in a wide variety of shapes, sizes, and colors. This, in part, is a result of the fact that each size, shape, and color scheme of a particular lure strongly affects the success or failure of a fisherman under particular conditions. However, the currently available technology is not configurable to have an effective appearance and produce acoustical signals to entice surrounding fish. Such acoustical signals alert fish to the lure and help the fish determine lure location.

Additionally, current technology is not capable of being programmed to mimic specific live bait species, as would be advantageous in attracting fish who eat those live bait species. Moreover, another problem with current bait and lures is the inability to generate other aquatic life sounds and/or to monitor aquatic life and report findings back to the angler. Such information may assist the angler in determining whether conditions are prime for fishing and/or what type of bait is best suitable for the present conditions.

Additional frequently used fishing tools include a scale to measure fish weight, and a ruler to measure fish length. These tools are particularly important during fishing tournaments, where limitations on either or both the fish length and fish weight may be imposed on the anglers. Should an angler disobey these regulations, whether intentional or unintentional, sanctions may range from not counting a particular fish to total disqualification of the angler from a tournament, and even to fines by local fish and wildlife protection agencies.

Currently, fish are weighed by scales which are held in the air by the angle while the fish dangles below such. However, current scales fail to perform a number of valuable actions, including obtaining a GPS position when weighing the fish. Moreover, current scales fail to indicate when such weighing is complete, thus requiring the angler to guess such while the fishing is moving while coupled to the scale which results in a constant change in the measured weight. Thus, the weight read by the angler while the fish is moving may be more or less than the actual fish weight.

Fish rulers as currently employed are typically rudimentary, such as being engraved across an igloo or cooler, and the angler must attempt to hold down the moving fish for measuring its length, and then write down the measured length by hand. Such a method is slow and introduces substantial possibility for error. Thus, it would be advantageous to have an electronic fish length measurement device which could quickly measure and automatically stores the fish length. Additionally, similar to the fish scale, a similar problem is lack of GPS knowledge and/or association of the fish length with the location from which it was caught. Knowledge and tracking of such GPS position may be vital to an angler in tracking and remembering where each catch is made, thereby indicating where optimal fishing conditions exist.

Further technology typically employed while fishing is a cull system. As known to those skilled in the art, such a system keep track of the fish onboard the boat. Such is advantageous, for example, when a large fish is caught, the smallest of the fish onboard will be culled and thrown back into fishing waters. Some current cull systems typically include a "tag" that is coupled to the fish and dials associated with each tag (possibly numbered or varying in color) which can be manually manipulated to indicate fish weight. However, such a system poses problems during night time, and may require more time to locate the desired tag. Moreover, current cull systems fail to keep track of any further information other than the fish weight.

Additionally, while each of the above technologies exist separately, there is no current system which enables communication between, and thus combination of all to give the angler an overall picture of what fishing conditions are like, what lures are working best, and what fish are currently onboard. Thus, in view of the above described limitations, a great need exists for a fishing system with increased monitoring and communication abilities.

SUMMARY OF THE INVENTION

The present disclosure introduces various illustrative embodiments for systems and methods for monitoring and communicating fishing data.

It is an object of the present disclosure to provide an automated fish culling system that includes a base station which includes a processor and base station display configured to display information corresponding to a plurality of cull tags, the base station display is communicably coupled to the processor. Each of the plurality of cull tags are configured to be associated with a fish and includes an electronic cull tag identifier. The system further includes a memory for storing data comprising information associated with the fish, the information comprising a fish weight, wherein the processor determines which fish to cull based on at least the fish weight associated with each fish, and indicates which fish to cull via at least the base station display.

It is another object of the present disclosure to provide a method for automated fish culling that includes displaying information corresponding to a plurality of cull tags with a base station display, the base station further including a processor communicably coupled to the base station display. The method further includes associating one of the plurality of cull tags with a fish, wherein each cull tag of the plurality of cull tags comprises an electronic cull tag identifier, storing information associated with the fish in a memory, the information comprising a fish weight, determining which fish to cull with the processor based on at least the fish weight of each fish stored in the memory, and indicating which fish to cull via the base station display.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as an exclusive embodiments. The subject matter disclosed is capable of considerable modification, alteration, and equivalents in form and function, as will occur to one having ordinary skill in the art and the benefit of this disclosure.

FIG. 3A illustrates a fish weighing system, according to one or more embodiments.

FIG. 3B depicts an internal view of the fish weighing system housing, according to one or more embodiments.

DETAILED DESCRIPTION

Figure 1:
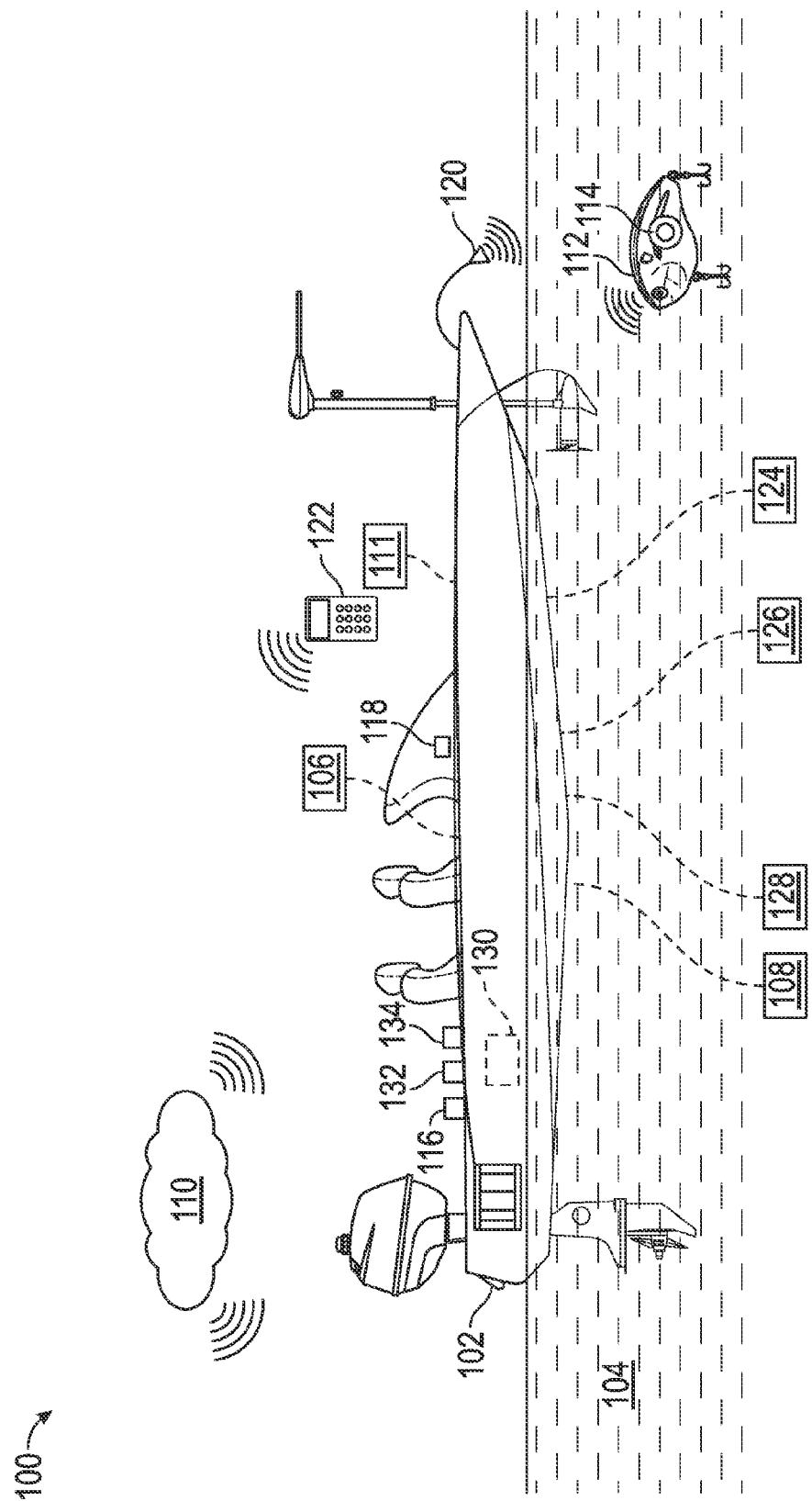
FIG. 1 depicts a system for monitoring and communicating fishing data, according to one or more embodiments.

The present disclosure generally relates to systems and methods for automated fish culling.

As used herein, a "processor" may be comprised of, for example and without limitation, one or more processors (each processor having one or more cores), microprocessors, field programmable gate arrays (FPGA's), application specific integrated circuits (ASICs) or other types of processing units that may interpret and execute instructions as known to those skilled in the art.

As used herein, "memory" may be any type of storage or memory known to those skilled in the art capable of storing data and/or executable instructions. Memory may include volatile memory (e.g., RAM), non-volatile memory (e.g., hard-drives), or a combination thereof. Examples of such include, without limitation, all variations of non-transitory computer-readable hard disk drives, inclusive of solid-state drives. Further examples of such may include RAM external to a computer or controller or internal thereto (e.g., "on-board memory"). Example embodiments of RAM may include, without limitation, volatile or non-volatile memory, DDR memory, Flash Memory, EPROM, ROM, or various other forms, or any combination thereof generally known as memory or RAM. The RAM, hard drive, and/or controller may work in combination to store and/or execute instructions.

As used herein, an "application" may be any type of program or code capable of being stored on memory and executed by one or more processors.

Referring now to the drawings, wherein like reference numbers are used herein to designate like elements throughout the various views and embodiments of a unit. The figures are not necessarily drawn to scale, and in some instances the drawings have been exaggerated and/or simplified in places for illustrative purposes only. One of the ordinary skill in the art will appreciate the many possible applications and variations based on the following examples of possible embodiments. As used herein, the "present disclosure" refers to any one of the embodiments described throughout this document and does not mean that all claimed embodiments must include the referenced aspects.

FIG. 1 depicts a system 100 for monitoring and communicating fishing data, according to one or more embodiments. As depicted, the system 100 includes an aquatic vessel, such as a boat 102 arranged in a body of water 104 for fishing. The system includes various non-aqueous ambient conditions monitoring means 106 for measuring and transmitting ambient atmospheric condition data. In some embodiments, the non-aqueous ambient conditions monitoring means 106 may include one or more pieces of equipment for measuring ambient atmospheric condition data such as, for example and without limitation, an anemometer for measuring wind speed, a wind vane for wind direction, thermometer for air temperature, and/or a barometer for measuring barometric pressure. In other embodiments, the ambient atmospheric condition data monitored additionally or alternatively includes solunar phase and tide-related information (e.g., tide flow, tide level, etc.). Again, such atmospheric condition data may each be measured by individual equipment, by equipment capable of obtaining various measurements, or even by a single piece of equipment capable of obtaining all measurements, such as a weather station. Moreover, all technology may be analog, digital, or a combination thereof.

The system 100 further includes aqueous ambient conditions monitoring means 108 for measuring and transmitting ambient aquatic condition data. In some embodiments, the aqueous ambient conditions monitoring means 108 includes one or more pieces of equipment for measuring ambient aquatic condition data such as, for example and without limitation, a microphone for measuring aquatic audio sounds and/or an aquatic-capable camera capable of capturing pictures, video, and/or still images. In other embodiments, aqueous ambient conditions monitoring means 108 may alternatively or additionally include equipment for measuring ambient aquatic condition data such as current direction, current speed, turbidity quality, water temperature and/or water depth. In further embodiments, the ambient aquatic condition data may alternatively or additionally include a quantity of dissolved Oxygen, a pH level measurement, and/or a zooplankton or phytoplankton measurement. As will be appreciated by those skilled in the art, advantageously, knowledge of one or more as the above measurements enables an angler to determine if conditions are appropriate for particular fishing desires, and may increase the angler's likelihood and/or size of a catch.

The system 100 further includes a database, for example and without limitation, database 110, configured for receiving, storing, and reporting data. In one embodiment, the database 110 receives and stores the above-discussed ambient atmospheric condition data and ambient aquatic condition data. As known to those skilled in the art, the database 110 may be hosted on any variety of computer or portable device (e.g., PDA, tablet, or smartphone). Thus, in one embodiment, the database 110 is arranged on or coupled to the boat 102 as a remote data store for the other onboard components. In alternative embodiments, the database 110 is a server, including a "cloud" hosted server. Methods of communication between the other onboard components and the database 110 are known in the art, including but not limited to, wired communications, wireless communications (e.g., near-field communication, Bluetooth, WIFI, RF, cellular network communications, and the like), or a combination thereof. Moreover, in further embodiments, transmissions to and from the database 110 are in "real-time" or substantially real-time, where the measurements are uploaded at a time period close to the time of measurement. In alternative embodiments, the measurements are stored locally on either the measuring device or a temporary storage (e.g., a handheld device, portable memory device such as a USB memory stick, or local memory on the boat 102), and then uploaded to the database 110 at a later point in time, for example, when the angler arrives closer to land or at home and is able to connect the storing device to the internet for upload.

In some embodiments, a "forum" may be arranged, where the angler may enable sharing of the database 110 information to a select group of friends, or alternatively to all for seeing current fishing conditions and results. Similarly, should others elect to do the same, the angler may advantageously be able to receive others information and adjust fishing tactics (e.g., lure type or fishing location) accordingly for optimum fishing conditions.

The system 100 further includes a global positioning system or unit (GPS) 110 for obtaining and reporting a GPS position. The GPS position is additionally saved in the database 110 and typically associated with at least a portion of the ambient atmospheric condition data and ambient aquatic condition data. As will be discussed in further detail below, such association of data is advantageous to the angler in order to determine, track, and remember for the future, where, when, and the conditions that surround particular or optimum fishing.

Figure 2A:
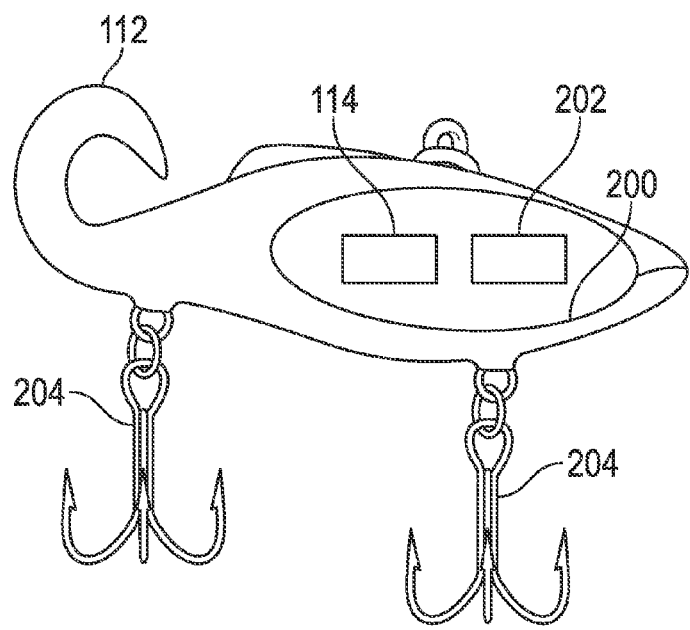
FIG. 2A depicts a fishing lure, according to one or more embodiments.

The system 100 further includes a fishing lure 112. Referring now to FIG. 2A, depicted is the fishing lure 112, according to one or more embodiments. In some embodiments, the fishing lure 112 may include a sound emitting means 114, for example and without limitation, a speaker capable of emitting sounds which replicate aquatic species or aquatic life in general. Advantageously, for example, such means may emit sounds replicating bait or distressed fish, thus attracting and catching larger predator fish with the one or more hooks 204 coupled to the fishing lure 112.

In one embodiment, the sound emitting means 114 may be arranged within a water proof inner capsule 200 of the fishing lure 112, but still capable of transmitting sound externally to the fishing lure 112. In alternative embodiments, the sound emitting means 114 may be water-resistant or waterproof and be partially or fully exposed to the water. The inner capsule 200 houses electronics 202 (described in detail below) for controlling the sound emitting means 114. In further embodiments, the lure may include one or more pieces of equipment (not shown) for also measuring ambient aquatic conditions.

Figure 2B:
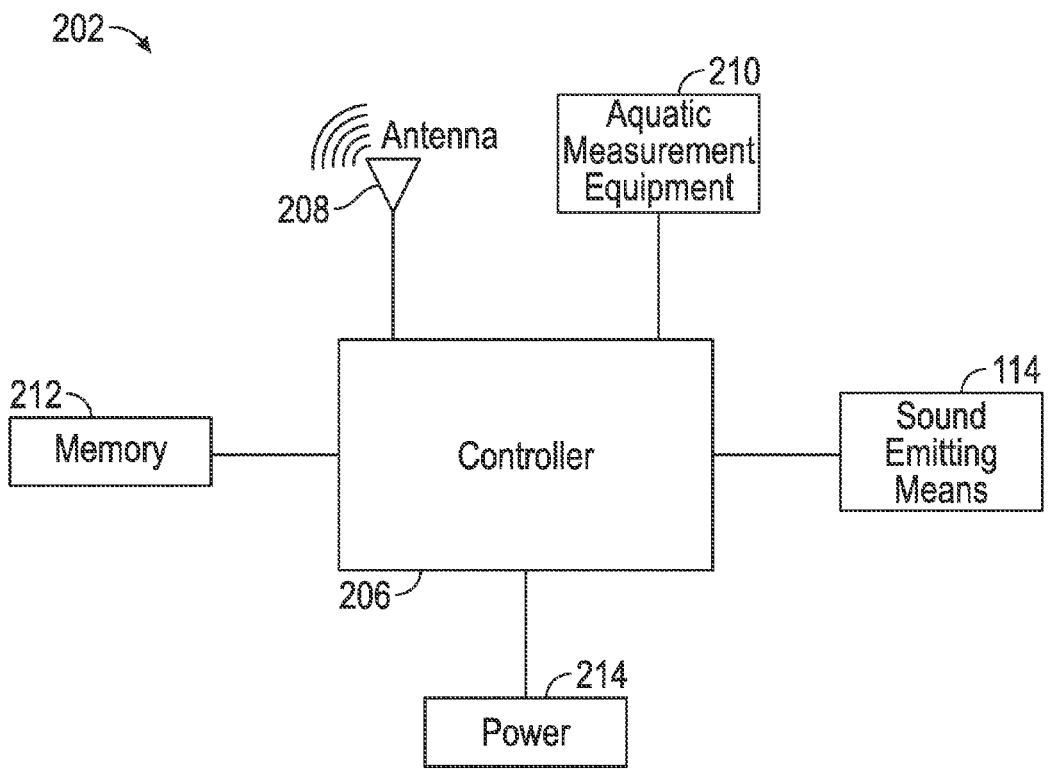
FIG. 2B illustrates a schematic diagram of electronics of the fishing lure, according to one or more embodiments.

FIG. 2B illustrates a schematic diagram of the electronics 202 of the fishing lure 112, according to one or more embodiments. As depicted, the electronics 202 include a controller 206, antenna 208, aquatic measuring equipment 210, memory 212, and a power source 214, all of which are electrically coupled together, either directly or indirectly, via one or more busses (not shown). Moreover, the electronics 202 are electrically coupled to the sound emitting means 114, thereby enabling control of output thereto.

The memory 212 is capable of storing one or more sounds capable of being executed by the controller 206 and output by the sound emitting means 114. The fishing lure 112 may be controlled by a user and communicated with via the fishing lure antenna 208 (or other alternative communication means, such as a 3.5 mm aux connection, a USB, mini-USB, micro-usb connection, or the like). In some embodiments, the fishing lure antenna 208 may communicate with a second antenna 120 coupled to the boat, or a remote device 122 via any variety of near-field communication and/or wireless technology, including but not limited to, Bluetooth, WIFI, RF, cellular network communications, and the like, including a combination thereof. The aquatic measurement equipment 210 may be one or more of the above-discussed equipment associated with the aqueous ambient conditions monitoring means 108. The power 214 may be one or more batteries which individually or in combination provide power to the electronics 202.

In some embodiments, the fishing lure includes a fishing lure information storage means for storing and reporting fishing lure information. The fishing lure information may include, for example and without limitation, the lure type, color, style, SKU, etc. In one embodiment, the memory 212 may act as the fishing lure information storage means and communicate the fishing lure information via the antenna 208. In another embodiment, the fishing lure information storage means may be the lure antenna 208 itself, such as when the antenna 208 is an RFID chip as known to those skilled in the art. The RFID chip is programmed with the fishing lure information and may communicate with the second antenna 120 which is capable of reading the RFID chip, thereby obtaining the fishing lure information.

Referring now back to FIG. 1, the system 100 further includes a control unit 116. Similar to discussed above, the control unit may be an onboard computer, tablet, hand-held PDA, or a smart phone, or the like. The control unit 116 is communicably coupled (e.g., wired, wirelessly, or a combination thereof) to the non-aqueous ambient conditions monitoring means 106, the aqueous ambient conditions monitoring means 108, the GPS unit 111, and the fishing lure 112 (e.g., via fishing lure antenna 208 and antenna 120). Thus, the control unit 116 is capable of both sending data to (i.e., controlling) the various devices, and receiving data from (i.e., reading) the various devices accordingly. The control unit 116 is further coupled to the database 110, thereby enabling transfer and receipt of information therewith. In some embodiments, the database 110 may directly communicate with the non-aqueous ambient conditions monitoring means 106, the aqueous ambient conditions monitoring means 108, the GPS unit 111, and the fishing lure 112. In other embodiments, all or some of the information may be communicated via the control unit 116.

Moreover, in further embodiments, the system 100 includes a display means 118 communicably coupled to the control unit 116. The display means 118 may be any technology capable of providing a display of information as known to those skilled in the art. In one embodiment, the display means may be in close proximity to the control unit 106, such as when both are integrated together in a single device, such as a tablet, hand-held PDA, or a smart phone, or the like. Alternatively, in other embodiments, such as depicted, the display means 118 and the control means 116 may be individual components as the display means 116 may be a monitor display which the angler can see, but the control unit 116 is arranged within the hull of the boat (or possibly offsite in other embodiments). In any regard, as the display means 118 is communicably coupled to the control unit 116 and capable of displaying one or more of the ambient atmospheric condition data, ambient aquatic condition data, GPS position, and fishing lure information (e.g., type, color, sounds currently stored thereon, etc.).

In other embodiments, the system 100 further includes various additional fishing-related equipment and hardware. In one embodiment, the system 100 includes the remote device 122. In some embodiments, the remote device 122 may be synonymous with the display means 116, for example if the display means 116 is a cell phone running an application for performing the abilities described and discussed herein. Moreover, the remote device 122 may include a trigger means or button (including a hardware and/or software "soft button", for example, as may be employed with a mobile application) that enables angler to "trigger" or take a "snap shot" or request that information be stored at a certain point in time. Further, such point in time may be when a fish catch is automatically detected by the fishing lure 112 and/or remote device 122. Data to be stored upon such an occurrence may include one or more of the ambient atmospheric condition data, ambient aquatic condition data, GPS position, and fishing lure information (e.g., information about the fishing lure, such as the type, color, sounds stores, etc. and/or information obtained by the fishing lure 112 via the aquatic measurement equipment 210).

Further embodiments alternatively or additionally include an aquatic speaker 124 for projecting sounds which mimic an underwater or aquatic ecosystem to attract predatory fish. Such sounds may replicate more than simply bait fish, for example, such may be the sounds of the water, the tides or current, other aquatic creatures. Advantageously, the aquatic speaker 124 may be individually or in combination with the sound emitting means 114 to mimic an aquatic ecosystem desirable to fish and increase the likelihood of a catch.

Similarly, in even further embodiments, the system 100 includes an aquatic light 126 for attracting fish and fish bait. The aquatic light 126 may be constructed of a variety of technologies, including regular light bulbs or LED, and may similarly be a variety of sizes, colors, and hue depending on what would best attract the desired type of fish for a fishing excursion or tournament. In some embodiments, the light 126 may be a stand-alone device, while in others, the light 126 may be temporarily or permanently coupled to the boat 102 in any known method to those skilled in the art. In further embodiments, the light may be controlled via the control unit 116 and/or remote device 122.

In other embodiments, the system 100 may alternatively or additionally include an aquatic sonar 128 as known to those skilled in the art which emits and receives sonar signals. Such sonar signals may be employed to detect, for example, aquatic life, aquatic structures, aquatic depth, and the like. Such may be advantageous to enable the angler to have further real-time information, possibly viewed via the display means 118 or the remote device 122, regarding both the aquatic life on the seabed and fish in an immediate area to the boat 102.

In further embodiments, the system 100 includes an automated cull system 130 configured to indicate to the angler which fish to cull. Described in more detail below, briefly, in one embodiment, the cull system 130 includes a base station, a plurality of cull tags, a GPS system, and a database. Some of the system 100 components may double to also be considered part of the cull system 130. For example, the cull system 130 GPS may employ GPS 111, and the cull system 130 database may employ database 110. As known to those skilled in the art, a cull system assists the angler in keeping track of statistics associated with fish in the live well, such as fish weight and length. Thus, it would be advantageous to have the automated cull system 130 which stores such statistics and automatically determines, and indicates to the angler, which fish to cull. This saves the angler time in culling the proper fish and returning to fishing.

Similarly, in even further embodiments, the system 100 includes an electric fish length measuring system 132 for measuring the length of the fish when caught. Described in more detail below, briefly, in one embodiment, the fish length measuring system 132 includes a housing having a processor arranged therein, a baseplate coupled to the housing and communicably coupled to the processor, wherein the baseplate employs an electronic fish length measuring means which generates a fish length measurement, and a display means coupled to the housing and communicably coupled to the processor for displaying the measured fish length. In further embodiments, the fish length measuring system 132 is communicably coupled with the system 100 (e.g., to control unit 116), and thus capable of storing measurements in the database 110. Moreover, such measurements may automatically be associated with the fish caught, thus enabling use by the cull system 130 in determining which fish to cull.

In other embodiments, the system 100 includes an electric fish weighing system 134 for measuring the weight of a fish when caught. Described in more detail below, briefly, in one embodiment, the fish weighing system 134 includes a housing having a processor arranged therein and coupled to a handle means enabling an angler to hold the housing in the air while weighing the fish. The housing is further coupled to a fish holding means and a scale for measuring and generating a fish weight. In some embodiments, some of the system 100 components may double to also be considered part of the fish weighing system 134. For example, in some embodiments, the fish weighing system 134 includes a GPS system (e.g., GPS 111) and a database (e.g., database 110). Advantageously, the GPS position can be associated with the fish weight and the caught fish and be stored in the database 110. Moreover, such may be communicated to the cull system 130 as further input for determining which fish to cull.

Overall, advantageously, the system 100 is capable of not only obtaining and indicating data pertaining to aqueous and non-aqueous conditions, but further capable of storing such information for tracking and future use. Moreover, in further embodiments, the system (e.g., software executed by the control unit 116 or remote device 122) may record fish catches, and store such in the database 110 with various associated information, such as the various aqueous and non-aqueous conditions.

In exemplary operation according to at least one embodiment, the angler may employ the non-aqueous ambient condition monitoring means 106 and the ambient condition monitoring means 108 to measure one or more of the aqueous and non-aqueous ambient conditions previously discussed, thereby enabling the angler to determine where optimal fishing may be located and/or what type of fishing lure 112 to use (and sound to emit therefrom). The angler may additionally employ the aquatic speaker 124 to broadcast one or more sounds that mimic an underwater ecosystem and/or an aquatic light, thereby attracting predatory fish. The angler may further employ the aquatic sonar 128 for emitting and receiving sonar signals, thereby enabling detection of aquatic life, aquatic structures, and/or aquatic depth.

The angler may additionally or alternatively base such choices off data obtained from other users in a forum, and/or data stored on the database 110. Control of such may be performed via the control unit, and obtained data (whether from the database 110 or aqueous or non-aqueous ambient condition monitoring means, 108 and 106, respectively) may be displayed via the display means 118 and/or the remote device 122. Such obtained data may further be stored in the database 110 for future use and recall.

The angler may control the fishing lure 112 and/or receive information from the fishing lure 112 while fishing. The angler may have a device on the boat 102 capable of communicating with the fishing lure 112, such as an onboard computer, tablet, hand-held PDA, or a smart phone, or the like, possibly communicating with the fishing lure 112 via the antenna 120 or remote device 122. Thus, for example, the angler may obtain a desired sound to be output from the database 110 (FIG. 1) and communicate such sound to the fishing lure 112 via the fishing lure antenna 208 to change which sound is output through the sound emitting means 114. For example, the angler may change which bait fish sound is being output in attempting to attract different or larger fish. Similarly, the angler could receive aquatic information acquired by the aquatic measuring equipment 210 back from the fishing lure 112 (e.g., water temperature) and adjust which sound is output or which type of lure should be used to maximize chances of catching a fish. Such obtained measurements may also be uploaded to the database 110.

Upon catching a fish, the system 100 may perform a variety of actions. For example, in one embodiment, the remote device 122 may automatically detect a catch has occurred, while in other embodiments, the angler may press a button (hard or "soft" button) on the remote device 122 to alert the system 100 a catch has occurred. In either case, the system then records part or all currently monitored data (e.g., ambient atmospheric and ambient aquatic condition data, and/or GPS position, and/or fishing lure information) and associate such with the fish.

Moreover, after a catch, the angler may employ the fish length measurement system 132 to measure the fish length and/or fish weighing system 134 to measure the fish weight. Either or both of which may additionally be associated with the fish and stored in the database 110.

FIG. 3A illustrates a fish weighing system 300, according to one or more embodiments. As depicted, the fish weighing system 300 includes a housing 302 having a processor 310 arranged therein, the housing 302 coupled to a fish holding means 306. In one embodiment, as depicted, the housing 302 may additionally be coupled to a handle means 304, thereby enabling an angler to hold the fish weighing system 300 to weigh small to medium size fish. In other embodiments, the housing 302 may be coupled to larger objects (e.g., a boat, dock, building, or the like (not shown)) for weighing large fish or big game fish which may possibly weigh hundreds of pounds. The fish weighing system 300 further includes a scale 308 coupled to the housing 302 and the fish holding means 306, thereby enabling measurement and generation of a fish weight.

For embodiment including the handle means 304, such may be any means known to those skilled in the art which enables the angler to hold the fish weighing system 300 in the air with the fish coupled to the fish holding means 306, thereby enabling measurement of the fish weight. For example and without limitation, the handle means 304 may be constructed from nearly at material, including a plastic, rubber, or metal; may be flexible (bendable) or inflexible; and in some embodiments, may be wider at the top or have a "T" handle for the user to hold the fish weighing system. In other embodiments, the handle means 304 may simply be a circular loop (not shown), possibly directly coupled to the housing 302.

The fish holding means 306 may be any means known to those skilled in the art which enables holding the fish while being weighed. In some embodiments, as depicted, the fish holding means 306 may be a lip grip or pair of clamps for arranging around the fish jaw. In other embodiments, the fish holding means 306 may be as simple as a hook capable of being arranged around the fish jaw.

The fish weighing system 300 further includes a scale 308 coupled to the housing 302 and the fish holding means 306, thereby enabling measurement and generation of the fish weight, and communication of such to the processor. In various embodiments, the scale may be wholly or partially encompassed within the housing 302, or not arranged therein at all (e.g., on the back of the housing 302 or below the housing 302), so long as the scale 308 is arranged such that it is capable of measuring the fish weight of the fish as coupled to the fish holding means 306.

Briefly referring to FIG. 3B, depicted is an internal view of the housing 302, according to one or more embodiments. As depicted, the housing 302 includes, among other things, the processor 310, a global position system (GPS) 312, a communication means 314, and a speaker 316. In other embodiments, as described above, the housing 302 may further partially or wholly include the scale 308.

The GPS 312 is configured to obtain and report a GPS position which may be associated with the measured fish weight upon a catch occurring. The communication means 314 is any means known to those skilled in the art capable of communicating information between the fish weighing system 300 and a storage device. Such communication means 314 may be, for example and without limitation, a wireless communication means (e.g., WIFI, Bluetooth, Zigbee, NFC (near field communication), and the like) or a wired communication means (e.g., communication via a USB port, mini-USB port, micro-USB port, etc.). In some embodiments, the storage device (not shown) may be the database 110 (FIG. 1) or a computer (including hand held and tablet devices) capable of storing the measured fish weight. In other embodiments, the fish weighing system 300 is communicably coupled to an automated cull system (e.g., cull system 130), either directly via any of the communication means 314, or indirectly, for example, via the database 110. Resulting therefrom, the cull system 130 is capable of obtaining the measured fish weight and indicating to the angler which fish to cull based at least in part thereon.

The speaker 316 is communicably coupled to the processor 310 and employed for at least one of indicating the progress of measuring the fish weight and/or indicating when measurement of the fish weight is complete. Such indications may be any variety of audible sounds, including different sounds which represent different progress and/or completion, or emitting such progress and/or completion in a language (e.g., emitting "progress 50% complete" or "weighing complete").

Referring now back to FIG. 3A, the fish weighing system 300 further includes a display screen 318 coupled to the housing 302 and communicably coupled to the processor 310. The display screen 318 displays the measured fish weight and the GPS position, either individually or simultaneously. In other embodiments, the display screen 318 may further display other information, such as the time and date, and/or progress of and/or completion of weighing the fish. As contemplated herein, all of the aforementioned may be displayed simultaneously on a single "screen", or individually on "multiple screens" which may be rotated through.

In some embodiments, the display screen 318 may be a touch screen, thereby not requiring additional buttons to control functionality thereof. Alternatively, the display screen 318 may be controlled via one or more buttons 320 (three depicted). The button(s) 320 may perform one or more functional aspects of the fish weighing system 300, such as controlling or changing the display screen 318 or commanding the fish weighing system 300 to store the measured fish weight to the storage device.

In further embodiments, the fish weighing system includes a measurement completion indication means for indicating if measuring of the fish weight is complete. Such means may be, for example and without limitation, the display screen 318 and/or emitting audible sounds from the speaker 316 as mentioned above. The display screen 318 may indicate, the progress of obtaining the fish weight and/or when such measuring is complete.

In other embodiments, alternatively or in addition to the display screen 318, the fish weighing system 300 may include one or more light emitting diodes (LEDs) 322 (two depicted) which indicate the progress of weighing the fish and/or indicating whether such weighing is complete. In one embodiment, a single multi-color LED 322 may be employed, thereby enabling a change in color (or varying colors) to indicate progress of weighing. For example, the LED 322 may be yellow if weighing is in progress, wherein the LED 322 may turn green when weighing is complete. In other embodiments, multiple LED's 322 may be employed, where each is a different color. Thus, for example, one of the LED's 322 may be yellow and active only when weighing is in progress, whereas the other LED 322 may be green and active only when weighing is complete.

Figure 3C:
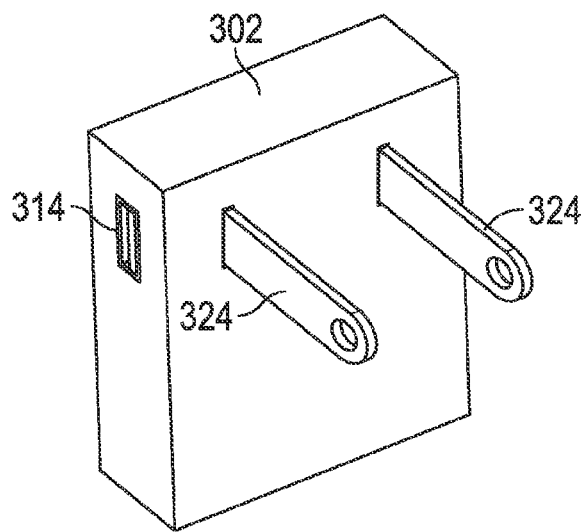
FIG. 3C is a rear-angled view of the fish weighing system housing, according to one or more embodiments.

Referring now to FIG. 3C is a rear-angled view of the fish weighing system housing 302, according to one or more embodiments. In particular, depicted is one embodiment of the communication means 314, wherein a wired communication means is employed. Such may be, for example, a USB port, Micro-USB port, mini-USB port, or the like which enables transfer of the fish weight and associated GPS position from the fish weighing system 300 to a storage device. Such embodiments of wired communication means may also function to power and/or charge a battery (not shown) of the fish weighing system 300. In other embodiments, alternatively or in addition thereto, a pair of charging prongs 324 may be coupled to the housing 302 (as depicted, coupled to the back of the housing 302) which enable wall or socket charging of the battery (if capable of being recharged). Such charging prongs 324 may be hingedly coupled to the housing 302, thereby enabling retractability of such charging prongs 324 into the housing when not in use, thereby prevent possible damage to the charging prongs 324 when not in use.

Figure 4:
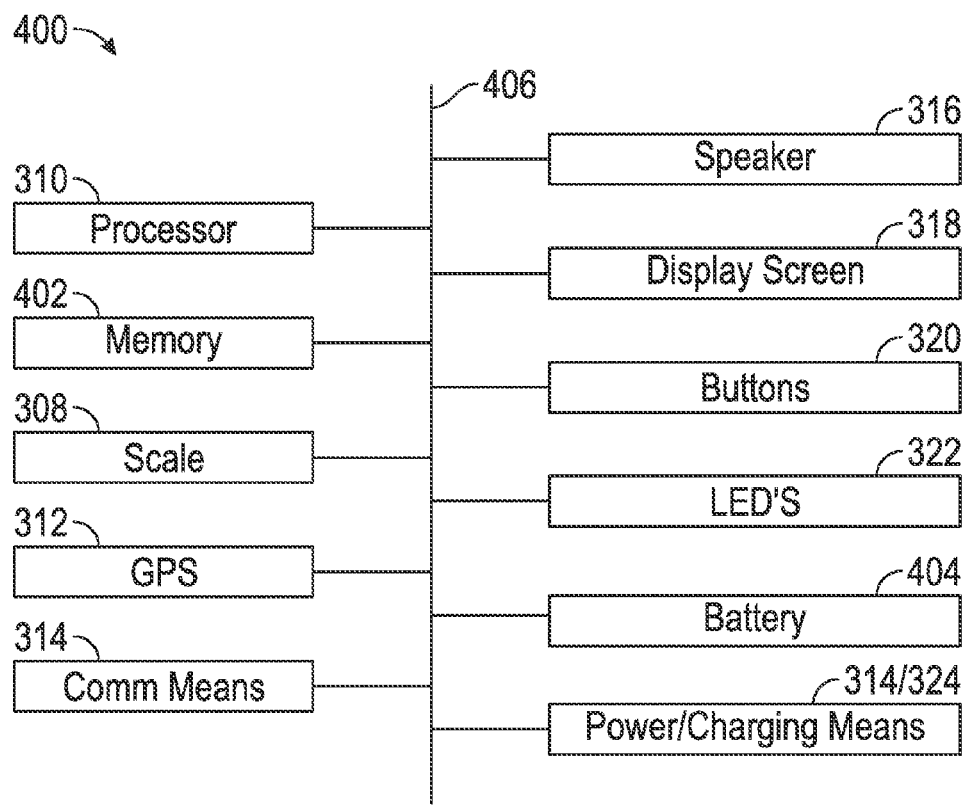
FIG. 4 is a block diagram of the fish weighing system, according to one or more embodiments.

FIG. 4 is a block diagram 400 of the fish weighing system 300, according to one or more embodiments. As illustrated, the diagram 400 includes the processor 310 and a memory 402 (both defined above) for storing and executing programs associated with the various functionality and hardware associated with the fish weighing system 300 and described herein. The block diagram 400 further includes a battery 404 for powering some or all of the various hardware, including but not limited to, the processor 310, scale 308, GPS 312, communication means 314, speaker 316, display screen 318, and LEDs 322. Additionally included is the power or charging means 324 and/or 314 (where the communication means can double as the charging means, such as various USB-type ports discussed herein). In further embodiments, the processor 310, memory 402, scale 308, GPS 312, communication means 314, speaker 316, display screen 318, buttons 320, LEDs 322, battery 404, and charging means 314 and/or 324 are electrically and/or communicably coupled via one or more busses 406.

In exemplary operation, the memory 402 may store, and the processor 310 may execute, a program configured to perform various functions with the aforementioned hardware. For example and without limitation, in some embodiments, the program may obtain a fish weight from the scale 308, wherein the measured fish weight is stored in the memory 402. While obtaining the fish weight, the program may employ a means for indicating the progress and/or the completion of obtaining the fish weight. In some embodiments, such means may be the display screen 318, while in other embodiments, the means may alternatively or additionally be the LED(s) 322 (including one or more colored LEDs 322). In further embodiments, the progress and/or completion of such measuring may be indicated via the speaker 316.

The processor 310 may further execute the program to obtain a GPS position via the GPS 312, and, upon completion of measuring the fish weight, the GPS position and fish weight are displayed via the display screen 318. Moreover, the processor 310 may associate the GPS position with the fish weight and store such in a storage device. The storage device may be local memory 402, or in further embodiments, be the database 110 being communicated with via the communication means 314, or a combination thereof. Moreover, in one embodiment, the fish weighing system 300 may be indirectly communicably coupled with the database 100 via an application running on a wireless device and acting as an intermediary or central control program.

In some embodiments, the processor 310 may execute code which measures the amount of inactive time of the fish weighing system (i.e., no weight on the scale 308, no buttons 320 bushed or activity on the display screen 318) and turn off the fish weighing system 300 after a predetermined amount of time has expired.

Figure 5:
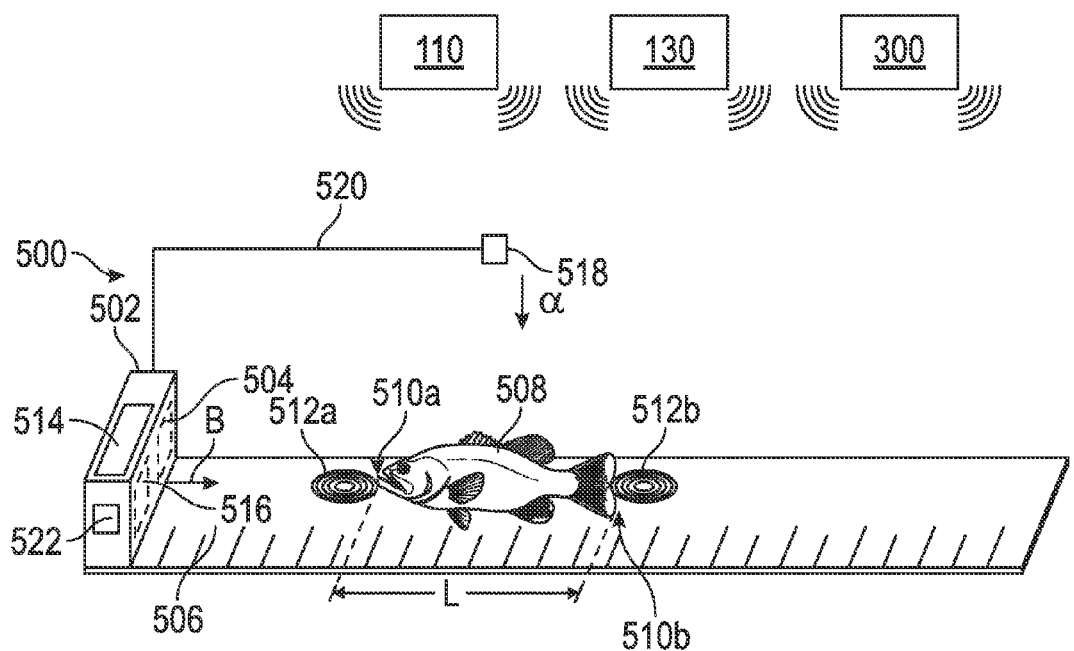
FIG. 5 illustrates a fish length measurement system, according to one or more embodiments.

FIG. 5 illustrates a fish length measurement system 500, according to one or more embodiments. As depicted, the system 500 includes a housing 502 having a processor 504 arranged therein. The system further includes a baseplate 506 coupled to the housing 504 and communicably coupled to the processor 504. The base plate 506 employs an electronic fish length measuring means which detects the presence and/or proximity of a fish 508 when arranged on the baseplate 506, and transmits corresponding signal(s) to the processor 504.

In some embodiments, the electronic fish length measuring means may be the base plate 506 itself, wherein the base plate 506 is a capacitive surface capable of detecting one or more capacitive points (e.g., similar to how a typical touch screen, including tablet and smart phone touch screens, operates). The capacitive surface may transfer raw signals to the processor 504 for interpretation and determination of the fish length, or alternatively may employ intermediate chips or processors (not shown) to partially or wholly interpret such raw signals, thereby sending converted signals and/or a final fish length determination signal to the processor 504. For example, according to one embodiment and as depicted, the fish 508 is arranged on the baseplate 506. The front end or head of the fish is arranged at a first location 510a and the rear end or tail of the fish 508 is arranged at a second location 510b. The base plate 506 detects capacitance changes in at least the first location 510a and second location 510b, and sends signals accordingly to the processor 504 which then determines the length therebetween (and thus, the length of the fish) is a fish length L. Of course, one of skill in the art will appreciate that, in another embodiment, the fish 508 may be arranged directly adjacent to the housing 502 or abut the housing 502, accordingly making the first location 510a adjacent to or abut the housing 502.

In other embodiments, the electronic fish length measurement means may be comprised of one or more sensor(s), depicted as a first sensor 512a and a second sensor 512b, arranged on or within the baseplate, and which operate based on change of one or more of any electrical signals (e.g., current, voltage, magnetic field, capacitance, and the like) as known to those skilled in the art. For example, the first sensor 512a and second sensor 512b may be capacitive sensors or hall effect sensors capable of detecting the proximity of a fish thereto when arranged on the base plate 506. The processor 504 may then receive signals from the first sensor 512a and second sensor 512b, and compute the length of the fish based thereon. Similar to above, such signals may be raw or converted signals.

The fish length measurement system 500 further includes a display means 514 coupled to the housing 502 and communicably coupled to the processor 504, thus capable of displaying the measured fish length. The display means 514 can be any means capable of displaying obtained measurements and fish lengths. For example and without limitation, the display means 514 may be an LCD or touch screen.

In further embodiments, the fish length measurement system 500 further includes a global positioning system (GPS) 516 which obtains and reports a GPS position. The GPS 516 is arranged within the housing 502 and communicably coupled to the processor 504, thus configured to transmit the GPS position obtained thereto. Resulting therefrom, the display means 514 is capable of displaying the GPS position, either individually or in combination with the other information (e.g., time, date, fish weight).

In other embodiments, the fish length measurement system 500 includes the database 110 (FIG. 1). The processor 504 associates the fish length measurement with other desirable information pertaining to the fish and then stores such in the database 110. In one embodiment, the GPS position obtained with the GPS 516 may also be associated with the fish length measurement and stored in the database 110.

In even further embodiments, the fish length measurement system 500 includes an automated cull system, such as those discussed and described herein (e.g., the automated cull system 130 of FIG. 1). Advantageously, with the fish length stored in the database 110, the automated cull system may automatically determine and indicate to the user which fish to cull based on such. Moreover, in other embodiments, the fish length measurement system 500 may include the fish weighing system 300. Similarly, the fish weight obtained therefrom may be stored in the database 110, thereby enabling the automated cull system 130 to determine which fish to cull based on both the measured fish weight and fish length.

In one embodiment, the fish length measurement system 500 includes one or more cameras 518 (one depicted) capable of capturing images of the fish 508 while being measured on the base plate 506. As depicted, the camera 518 is communicably coupled to the processor 504, thereby enabling transfer of captured images thereto. In one embodiment, the camera 518 may be supported by one or more arms 520. The arm 520 may be coupled to the housing 502, the baseplate 506, or be free-standing. The camera 518 may be positioned directly over the fish 508 or at an angle, so long as the camera 518 is capable of capturing an image of the fish 508 in the direction a while arranged on the baseplate 506. In further embodiments, the camera 518 (or an additional camera) may be coupled to the housing 502 such that a picture is captured in the direction β. In even further embodiments, the camera 518 may be a stand-alone camera, or possibly coupled to a mobile device, such as a cell phone, tablet, pda, etc. and communicably coupled (wired or wirelessly as described herein) to the processor 504 and/or database 110 for transfer of the picture thereto.

In further embodiments, the fish length measurement system 500 includes a communication means 522. The communication means 522 may be, for example and without limitation, a wireless communication technology (e.g., WIFI, Bluetooth, Zigbee, etc.), a wired technology (e.g., communication via a USB port, mini-USB port, micro-USB port, etc.), or a combination thereof. The communication means 522 enables communication between the fish length measurement system 500 and any device in which may desire or benefit from knowledge of the measured fish weight, such as, for example and without limitation, the database 110, cull system 130, and fish weight measurement system 300.

Figure 6:
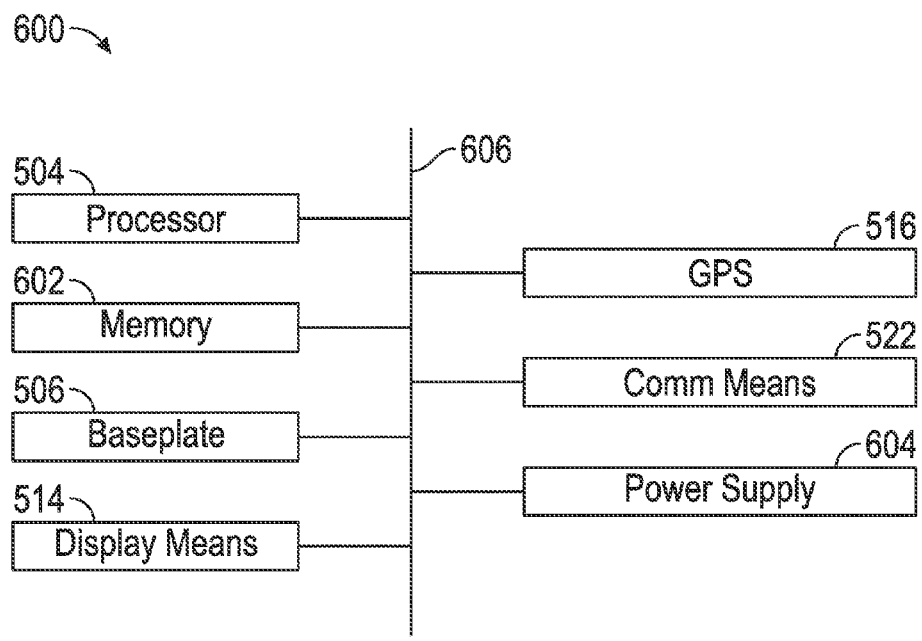
FIG. 6 is a block diagram of the fish length measurement system, according to one or more embodiments.

FIG. 6 is a block diagram 600 of the fish length measurement system 500, according to one or more embodiments. As illustrated, the diagram 600 includes the processor 504 and a memory 602 (as defined herein) for storing and executing programs associated with the various functionality and hardware associated with the fish length measurement system 500 and described herein. The diagram 600 further includes a power supply 604 for powering the various hardware, including but not limited to, the processor 504, baseplate 506 (including any sensors employed), the display means 514, the GPS 516, and the communication means 522. The power supply 604 may be in the form of a power input, such as a wall-plug, or may be a battery, either rechargeable or non-rechargeable. In one embodiment, the power supply 604 may be a battery capable of being wirelessly recharged (e.g., via inductance). In further embodiments, the processor 504, memory 602, baseplate 506, display means 514, GPS 516, communication means 522, and power supply 604 are electrically and/or communicably coupled via one or more busses 606.

Referring now back to FIG. 5, in exemplary operation, according to one or more embodiments, the angler arranges the fish 508 on the baseplate 506, thereby generating capacitive measurements via the base plate 506 (and in some embodiments, the first sensor 512a and second sensor 512b). The capacitive measurements may be translated or converted from raw to scaled data prior to arriving at the processor 504, or such may be performed by the processor 504. Upon receiving such measurements, the processor 504 determines the fish length and may store the fish length in memory 602. Additionally, the processor 504 may display the fish length via the display means 514. Moreover, the processor 504 may associate the fish length with the fish 508, and transmit such information to the database 110 via the communication means 522 for future recall.

In further embodiments, the system 500 may further obtain a fish weight with a fish weighing system, such as the fish weighing system 300. The measured fish weight may be associated with the fish 508, along with the fish length and GPS position, and stored in the database 110. Additionally, in other embodiments, a camera 518 may obtain a picture of the fish 508 arranged on the base plate 506 during weight measurement, and such picture may also be associated with the fish and stored in the database 110. In some embodiments, the camera 518 may be operated via an application running on a mobile device.

In other embodiments, the system 500 obtains a GPS position via the GPS 516. The GPS position may be displayed via the display means 514, and further associated with the determined fish length. Such may then be transmitted to the database 110 via the communication means 522. Advantageously, such enables an angler to later determine which locations resulted in optimal fishing (i.e., obtaining the heaviest fish) and return to that location.

In further embodiments, where the system 500 includes an automated cull system 130, the information stored in the database 110 such as the fish weight and fish length may be distributed to, and employed by the automated cull system 130 in determining which fish to instruct the angler to cull. Advantageously, the angler no longer needs to mentally or physically log the readings of their catch, as this can be done electronically and automatically. In addition to ease of use, this also saves time, allowing the angler to return to fishing quicker.

Figure 7A:
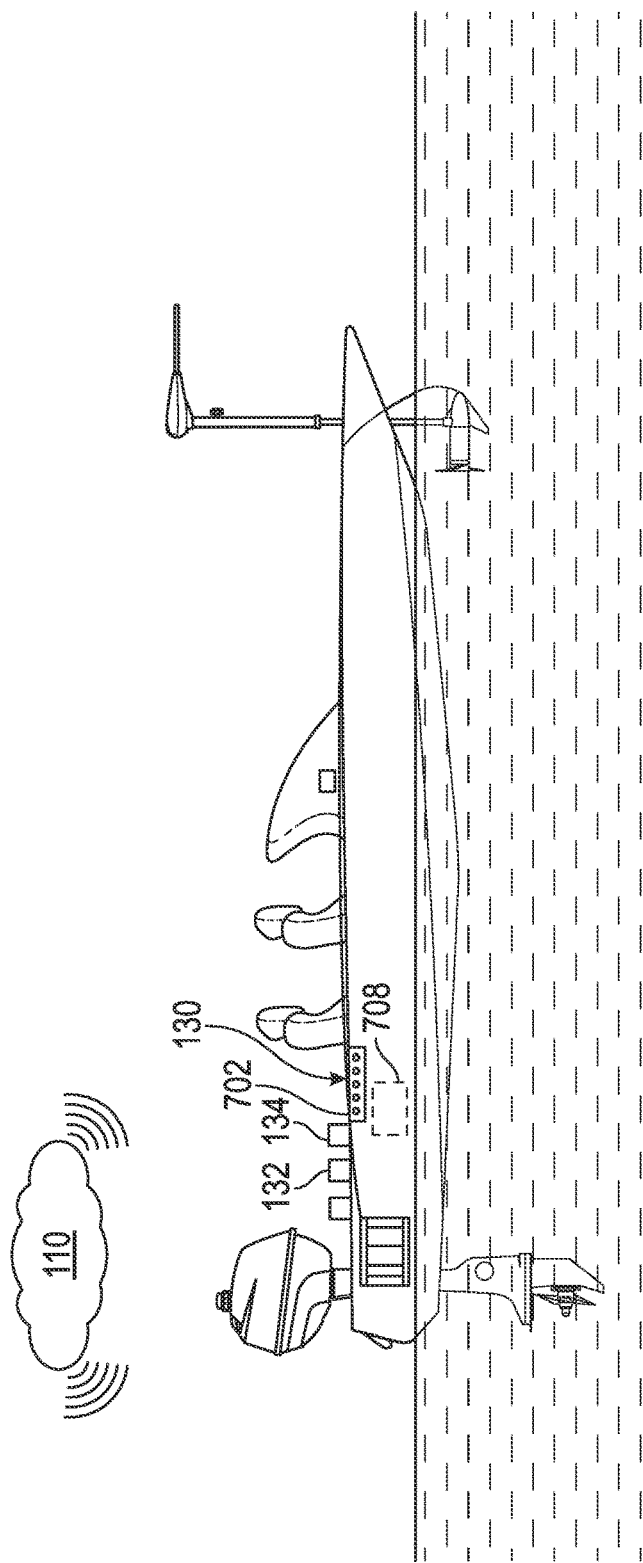
FIGS. 7A, 7B, and 7C illustrate a base station and cull tags associated with a cull system, according to one or more embodiments.
Figure 7B:
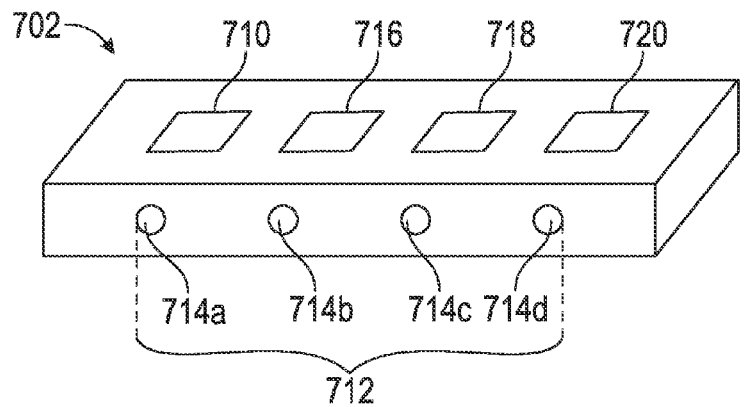
Figure 7C:
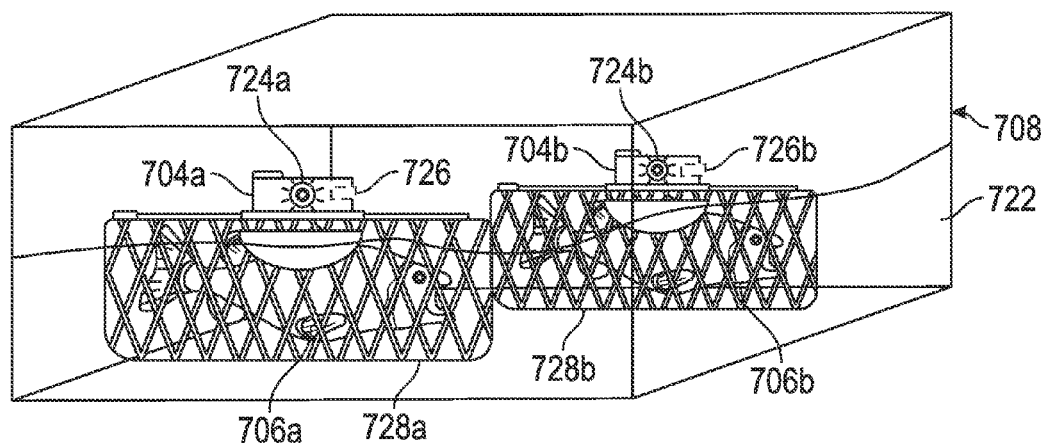

FIGS. 7A, 7B, and 7C illustrate a base station and cull tags associated with the cull system 130, according to one or more embodiments. As illustrated in FIG. 7A, the cull system 130 includes a base station 702 which is communicably coupled to cull tags 704a,b (depicted in FIG. 7C as a first cull tag 704a and a second cull tag 704b) associated with fish 706a,b (depicted as a first fish 706a and a second fish 706b). Upon catching a fish 706a,b, one of the cull tags 704a,b is associated therewith in a variety of manners discussed below, and the fish 706a,b and cull tag 704a,b are placed in the live well 708 during continued fishing and/or for transport.

FIG. 7B is an enlarged view of the base station 702, according to one or more embodiment. The base station 702 includes a processor 710 and a base station display 712 communicably coupled thereto. The base station display 712 is configured to display information regarding which fish 706a,b to cull and/or information associated with one or more of the fish 706a,b. In one embodiment, the base station display 712 includes a plurality of light emitting diodes (LEDs) 714a-d (depicted as a first LED 714a, second LED 714b, third LED 714c, and fourth LED 714d). Each of the LEDs 714a-d may be associated with one of the cull tags 704a,b. For example, the first LED 714a may be associated with the first cull tag 704a, the second LED 714b may be associated with the second cull tag 704b, wherein the third and fourth LED 704c,b, are not associated with any cull tags and are unused, but available for association with additional cull tags that may be employed by the angler in the future with additional catches. It will be appreciated that more or less than four LEDs 704a-d may be employed in alternative embodiments.

The processor 710 indicates which fish to cull by activating at least one of the LEDs 714a-d. For example, to indicate the angler should cull the first fish 706a, the processor may activate the first LED 714a. The angler may then locate the first cull tag 704a associated with the first fish 706a, thereby being able to cull the first fish 706a. Such activation may be, for example and without limitation, permanent until the angler deactivates such, may be for a predetermined period of time, flashing the first LED 714a on and off at a predetermined rate, and/or changing the color of the first LED 714a (if the first LED 714a is a multi-color LED or capable of such).

In one embodiment, the base station display 710 includes a digital or liquid-crystal display (LCD) screen (not depicted) capable of displaying information associated with one or more of the fish 706a,b associated with the cull tags 704a,b. Such information may include, for example and without limitation, the fish 704a,b weight, length, and GPS location where caught.

The base station 702 further includes a base station communication means 716 communicably coupled to the processor 710. The base station communication means 716 may be any variety of wired and/or wireless technologies (e.g., near-field communication, Bluetooth, WIFI, RF, cellular network communications, and the like), or a combination thereof. The base station communication means 716 may be employed to communicate with a variety of other devices, including but not limited to the database 110 for storing and retrieving information associated with the fish 706a,b, and sending information or commands to the cull tags 704a,b as described in detail below.

The base station further includes a global positioning system (GPS) 718 for obtaining and reporting a GPS position. The GPS 718 is communicably coupled to the processor 710, thereby enabling the processor 710 to associate the obtained GPS position with a fish 706a,b upon being caught, and storing such in the database 110 as well. In some embodiments, the GPS 718 is arranged within the base station 702. In other embodiments, it may be arranged external to the base station 702 but still communicably coupled to the processor 710.

Additionally, in some embodiments, the base station 702 further includes a speaker 720 communicably coupled to the processor 710. Thus, the processor 710 may audibly indicate to the user which fish to cull via the speaker 720 alternatively or in addition to indications via the base station display 712.

Referring now to FIG. 7C, illustrated is the cull tags 704a,b associated with a fish 706a,b as arranged in water 722 within the live well 708, according to one or more embodiments. In one embodiment, as depicted, each cull tag 704a,b includes an electronic cull tag identifier 724a,b (depicted as a first electronic cull tag identifier 724a and a second electronic cull tag identifier 724b) and a cull tag wireless transceiver 726a,b (depicted as a first cull tag wireless transceiver 726a and a second cull tag wireless transceiver 726*b*). More specifically, as depicted, the first cull tag 704*a* includes the first electronic cull tag identifier 724*a* and first cull tag wireless transceiver 726*a*, and the second cull tag 704*b* includes the second electronic cull tag identifier 724*b* and second cull tag wireless transceiver 726*b*.

In some embodiments, the electronic cull tag identifier 724*a,b* includes an LED which may be activated by the processor 710 via a signal received through the cull tag wireless transceiver 726*a,b*. In further embodiments, the LED is a multi-color LED (i.e., an LED capable of emitting multiple colors) and activated to be a particular color, thereby indicating which fish 706*a,b* to cull. In other embodiments, the electronic cull tag identifier 724*a,b* includes a display (e.g., an LCD) capable of displaying formation associated with the fish 706*a,b*, such as the fish weight, length, and/or GPS location caught.

In one embodiment, the cull tag 704*a,b*, is associated with the fish 706*a,b* via a hook or clamp arranged through, under, and/or around the fish lip or jaw as known to those skilled in the art. However, as such is intrusive to the fish 706*a,b*, trauma and shock may be caused, sometimes even killing the fish before the angler's return to shore after fishing during a tournament. In other embodiments, as depicted, the cull tag 704*a,b* is associated with the fish 706*a,b* via a net 728*a,b* (depicted as a first net 728*a* coupled to the first cull tag 704*a*, and a second net 728*b* coupled to the second cull tag 704*b*). The net 728*a,b* encompasses the fish 706*a,b* such that the fish 706*a,b* is capable of swimming freely therein and liquid can pass therethrough. Advantageously, such enables quick culling of the fish 706*a,b*, but prevents damage, harm, and shock to the fish 706*a,b* as it can swim freely within the net 728*a,b* and very little, if any, bleeding or trauma is caused to the fish's lip or jaw.

In other embodiments, the system may include the electronic fish weighing system 134 for measuring the fish weight, wherein the electronic fish weighing system 134 is communicably coupled to the base station 702, for example, via the base station communication means 716. In further embodiments, the system may include the electronic fish length measurement system 132 for measuring the fish length. The electronic fish length measurement system 132 may also be communicably coupled to the base station 702, for example, via the base station communication means 716. The fish weight and/or fish length may be associated with the fish and stored in the database 110 for later recall, for example, to be used in determining which fish to cull.

In exemplary operation, while fishing, the angler catches and weighs the fish 706*a,b* along with obtaining the fish length. The fish weight may be associated with the fish 706*a,b* and stored in the database 110 for later recall. The angler also associates one of the cull tags 704*a,b* with the fish 706*a,b* via any of the variety of means discussed above (e.g., via a hook, clamp, net, or the like), and the places the fish 706*a,b* and associated cull tag 704*a,b* in the live well 708 (FIG. 7A).

Upon the angler reaching the catch limit or needing to cull a fish 706*a,b*, the angler may employ the automated fish culling system 130. The processor 710 determines which fish 706*a,b* to cull based on at least the fish weight. The fish weight may be obtained via the fish weighing system 134, recalled from memory, and/or downloaded from the database 110. The processor 710 indicates which fish 706*a,b* to cull via the base station display means 712. Thus, the processor may activate, for example and without limitation, the first LED 714*a*, thereby indicating to cull the first fish 706*a*. The first LED 714*a* may be a particular color, thereby indicating to cull the same color cull tag 704*a*. Moreover, the processor 710 may employ the speaker 720 to also audibly indicate that the angler should cull the first fish 706*a*.

The processor 710 may also indicate which fish 706*a,b* to cull via the electronic cull tag identifier 724*a,b*. For example, in addition to indicating to cull the first fish 706*a* via the first LED 714*a* of the base station display 712, the processor 710 may further indicate to cull the first fish 706*a* via a communication signal between the base station communication means 716 and the first cull tag wireless transceiver 726*a* of the first cull tag 704*a*, thereby activating the first electronic cull tag identifier 724*a*. In further embodiments, the processor 710 may alternatively or additionally indicate which fish 706*a,b* to cull via communication with an application running on a mobile device communicably coupled to the base station 702.

Advantageously, such a system would enable the angler to more efficiently and effectively fish. This is due to the angler being automatically notified of which fish to cull, thereby not having to manually review or determine the weight of each fish which consumes valuable fishing time. Moreover, the automation of the cull system 130 being able to recall fish weights and/or retrieve them from the database 110, and then automatically determining which fish 706*a,b* to cull further saves the angler time. Additionally, the visual notifications of the base station display 712 (and possibly the electronic cull tag identifier 724*a,b* too) and/or audible notifications from the speaker 720 make very clear which fish needs to be culled. The visual notifications of the electronic cull tag identifier 724*a,b* also further assist the angler in identifying the proper cull tag 704*a,b*, thereby further the angler's chance of culling the proper fish the first time.

Figure 8A:
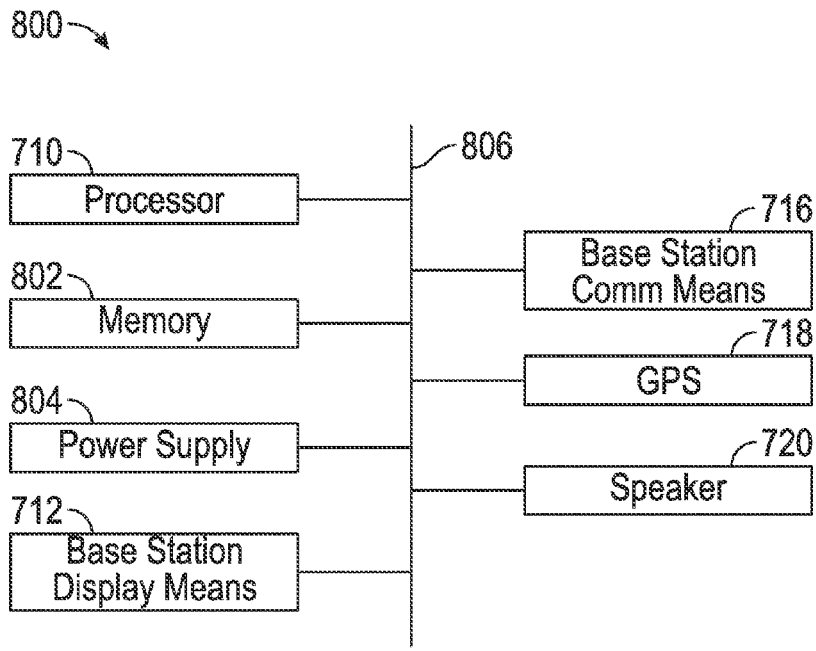
FIG. 8A is a block diagram of the base station of the cull system, according to one or more embodiments.

FIG. 8A is a block diagram 800 of the base station 702 of the cull system 130, according to one or more embodiments. As illustrated, the diagram 800 includes the processor 710 and a memory 802 (as defined herein) for storing and executing programs associated with the various functionality and hardware associated with the base station 702 and described herein. The diagram 800 further includes a power supply 804 for powering one or more of the various hardware, including but not limited to, the processor 710, the base station display 712, the base station communication means 716, the GPS 718, and/or the speaker 720. The power supply 604 may be in the form of a power input, such as a wall-plug, or may be a battery (including a connection to the battery onboard the boat 102), either rechargeable or non-rechargeable. The processor 710, memory 802, power supply 804, base station display 712, base station communication means 716, GPS 718, and speaker 720 are electrically and/or communicably coupled via one or more busses 806.

Figure 8B:
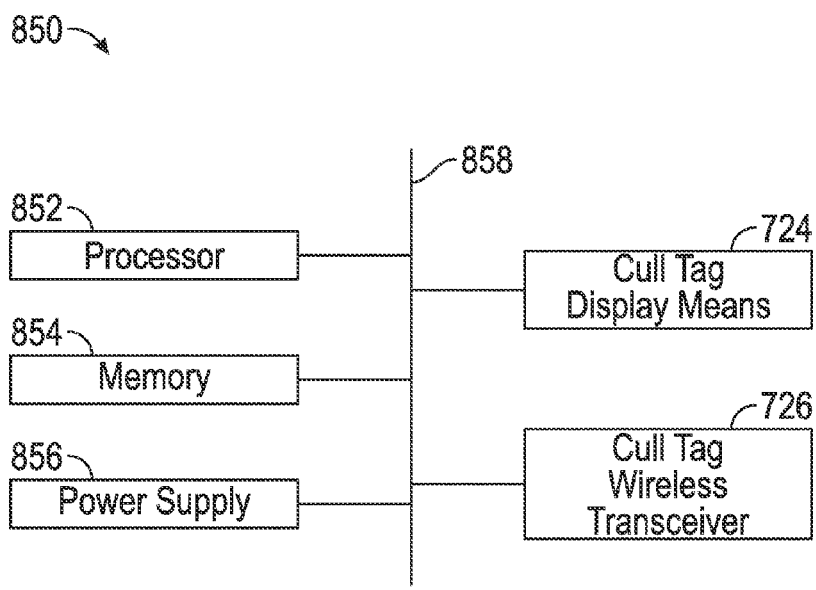
FIG. 8B is a block diagram of one of the cull tags of the cull system, according to one or more embodiments.

FIG. 8B is a block diagram 850 of one of the cull tags 704*a,b* of the cull system 130, according to one or more embodiments. As illustrated, the diagram 850 includes a processor 852, a memory 854 (as defined herein) for storing and executing programs associated with the various functionality and hardware associated with the cull tags 704 and described herein. The diagram 850 further includes a power supply 856 for powering one or more of the various hardware, including but not limited to, the processor 852, the electronic cull tag identifier 724*a,b*, and/or the cull tag wireless transceiver 726*a,b*. Moreover, all of the aforementioned are electrically and/or communicably coupled via one or more busses 858.

Figure 9:
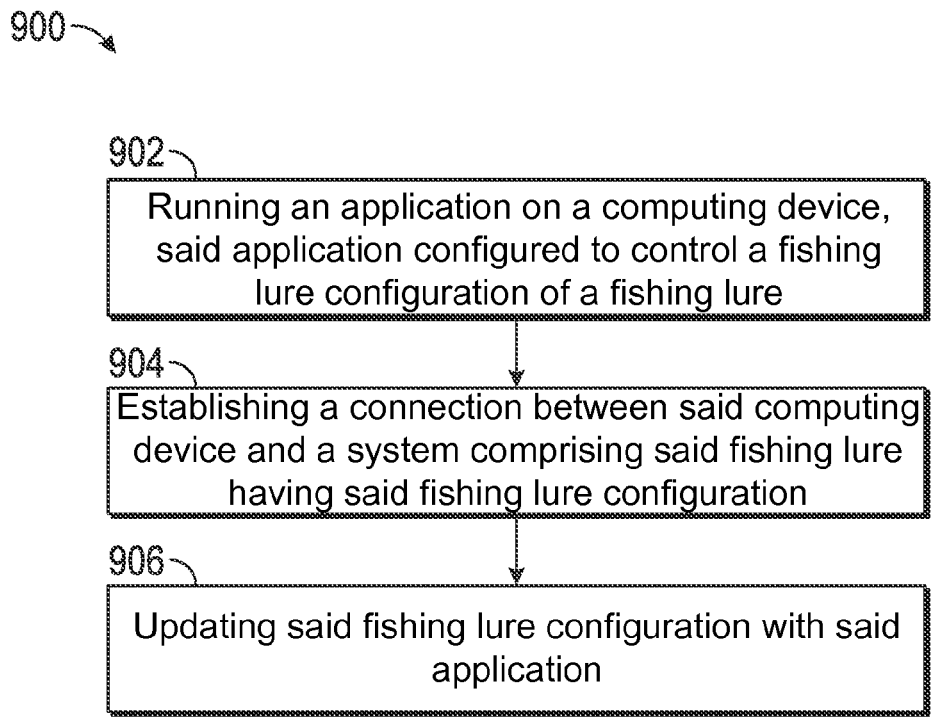
FIG. 9 depicts a flow diagram of an illustrative method for controlling fishing hardware and displaying fishing information, according to one or more embodiments.

FIG. 9 depicts a flow diagram of an illustrative method 900 for controlling fishing hardware and displaying fishing information, according to one or more embodiments. At block 902, the method 900 includes running an application on a computing device having display means for displaying the application, wherein the application is configured to display and control a fishing lure configuration of a fishing lure. In various embodiments, the computing device may be, for example and without limitation, a computer integrated with a boat, a mobile device (e.g., cellular telephone, iPad, tablet computer, and the like), or could be a remote device such as a "dongle" which includes a display screen and limited control and command keys.

At block 904, in one embodiment, a connection is established between the computing device and a system which includes the fishing lure, wherein the fishing lure has a fishing lure configuration which comprises one or more sounds resembling the prey of a fish capable of being emitted by sound emitting means of the fishing lure.

In further embodiments, the system includes a non-aqueous ambient conditions monitoring means such as the non-aqueous ambient conditions monitoring means 106 (FIG. 1) for measuring and transmitting ambient atmospheric condition data, and an aqueous ambient conditions monitoring means such as the aqueous ambient conditions monitoring means 108 for measuring and transmitting ambient aquatic condition data. The system further includes a global positioning system (GPS) for obtaining and reporting a GPS position. In such an embodiment, the method may further include storing one or more of the ambient atmospheric condition data, the ambient aquatic condition data, the GPS position, and the fishing lure information of the fishing lure in a database means via the application, wherein the database is configured for receiving, storing, and reporting one or more of the ambient atmospheric condition data, the ambient aquatic condition data, the GPS position, and the fishing lure configuration.

In some embodiments, the application predicts a preferable fishing lure configuration based on the GPS position and corresponding geographic data, including but not limited to, data corresponding to the GPS position, previous fishing catches, weather conditions, etc. The predicted fishing lure configuration may include indication of the type of lure which is likely to produce best results, and/or, in some embodiments, a configuration of the lure's light or LED eyes (e.g., activated and/or blinking in a particular pattern, rate, or brightness) and/or sound to be downloaded to the lure and emitted from the lure speaker. The application may then display such a prediction to the angler who may elect to employ the configuration, thereby downloading the configuration from the computing device and programming the fishing lure therewith. Of course, such a recommended configuration may be altered or rejected by the angler based on personal experience, knowledge, and fishing skills.

In further embodiments, the application indicates the fishing conditions to the angler based on the GPS position via the computing device display as a color-based system. For example and without limitation, the display may include a scale with various colors or a blended color scheme, such as green, yellow, and red, wherein an indicator indicates most preferable fishing conditions by pointing to the green portion of the scale, moderate or somewhat favorable fishing conditions by pointing to the yellow portion of the scale, and unfavorable or undesirable fishing conditions by pointing to the red portion of the scale. In another embodiment, an LED may change colors to indicate the fishing conditions. In even further embodiments, a numeric scale-based system may be employed. For example, a low value (e.g. 1) may represent a least favorable fishing conditions, a medium value (e.g. 5) may represent a more favorable fishing condition, and a high value (e.g. 10) may represent very favorable fishing conditions. Of course, those skilled in the art will appreciate the various other embodiments, including other color schemes and scale ranges and interpretations that may be employed and are contemplated herein.

At block 906, the fishing lure configuration is updated via the application. In one embodiment, the sounds are pre-downloaded on the lure memory 212 at the time of manufacturing, thus updating the fishing lure configuration of the fishing lure merely enables or disables (e.g., via a "key") one or more of the sounds to be emitted via the sound emitting means. In other embodiments, updating the fishing lure configuration actually downloads one or more sounds to the fishing lure memory, or, alternatively or in addition thereto, sounds may be removed from the fishing lure memory.

As mentioned above, in some embodiments, one or more of the ambient atmospheric condition data, ambient aquatic condition data, and GPS position may be stored in database 110. Additionally, information associated with the fishing lure may also be stored in the database. In one embodiment, the application enables the angler to input a note (such as the actual weather, fishing conditions, boat type, other equipment used, etc.), associate the note with the type of lure employed and geographic location, and store the note in the database.

In further embodiments, the application establishes a connection with an electric fish length measurement system, such as electric fish length measurement system 132 (FIG. 1). The application may display the measured fish length to the angler, while additionally associating the fish length with the caught fish and storing the fish length in the database. Similarly, in other embodiments, the application may alternatively or additionally establish a connection with an electric fish weighing system, such as the electric fish weighing system 134 (FIG. 1). The application may display the measured fish weight to the angler, while additionally associating the fish weight with the caught fish and storing the fish weight in the database. Moreover, alternatively or additionally thereto, in further embodiments, the application establishes a connection with a cull system, such as the cull system 130 (FIG. 1). The application may determine and indicate to the user which fish to cull based on the previously measured weight of each fish.

Figure 10A:
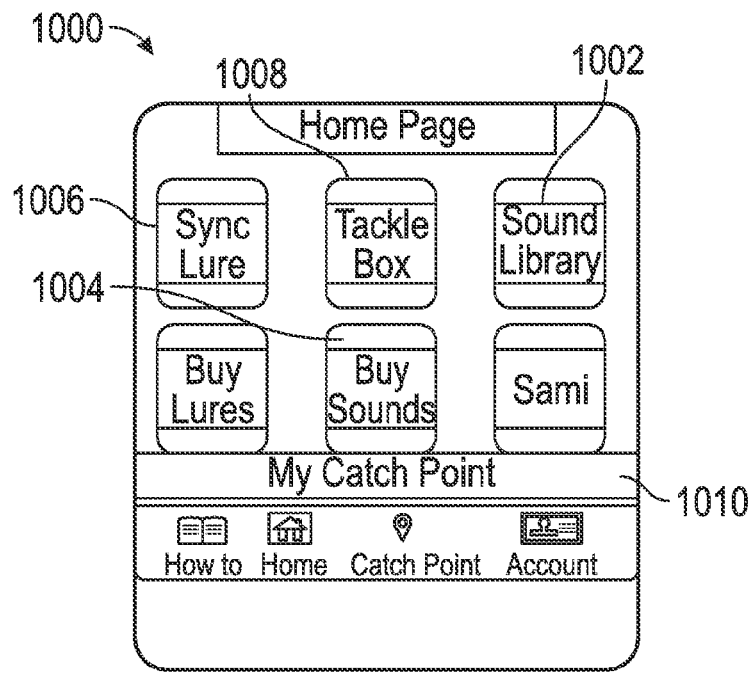
FIG. 10A and FIG. 10B depict a visualization of various screens of the application, according to one or more embodiments.

FIG. 10A depicts a visualization of a first screen 1000 of the application, according to one or more embodiments. In one embodiment, the first screen 1000 represents a "home page" and includes various options for operating the application and configuring a fishing lure. For example, as depicted, the first screen 1000 includes a sound library function 1002 that enables an angler to select from sounds which may already be programmed on the fishing lure or available in the application for download to the fishing lure. Additionally, a "buy sounds" function 1004 enables the angler to buy additional pre-recorded sounds from others or possibly a database of available sounds. Upon selection of a sound for the fishing lure to emit, the angler may apply such a selection by "syncing" the lure via a synchronization function 1006.

As discussed above, in one embodiment, such sounds are downloaded from the application to the lure, thereby updating the fishing lure memory (e.g. memory 212 of FIG. 2B). In another embodiment, the sounds are pre-downloaded on the lure memory 212 at the time of manufacturing, whereby the synchronization function 1006 may transmit a "key" to the lure, thereby unlocking one or more sounds available to be emitted by the lure.

The angler may alternatively have previously saved configurations which may be easily accessible via a "tackle box" function 1008. As discussed above, the fishing lure may additionally have light (e.g., one or more LEDs), thus configurations may include both a sound portion and a light configuration portion which are downloaded to the lure upon synchronization.

As discussed above and herein, the system 100 may include a variety of monitoring equipment, including but not limited to, the aqueous ambient condition monitoring means 108, the non-aqueous ambient condition monitoring means 106, the GPS 111, the fish length measurement system 132, the fish weighing system 134, and others. Measurements from one or more of the monitoring equipment may be recorded in the computing device or a database 110 communicably coupled thereto. Thus, in some embodiments, such a recording may be performed via the angler employing a record function 1010. Alternatively or in addition thereto, such a recording may be automatically performed upon the system determining a catch has been made, thereby saving the angler time and worry about recording the data associated with the fish caught.

Figure 10B:
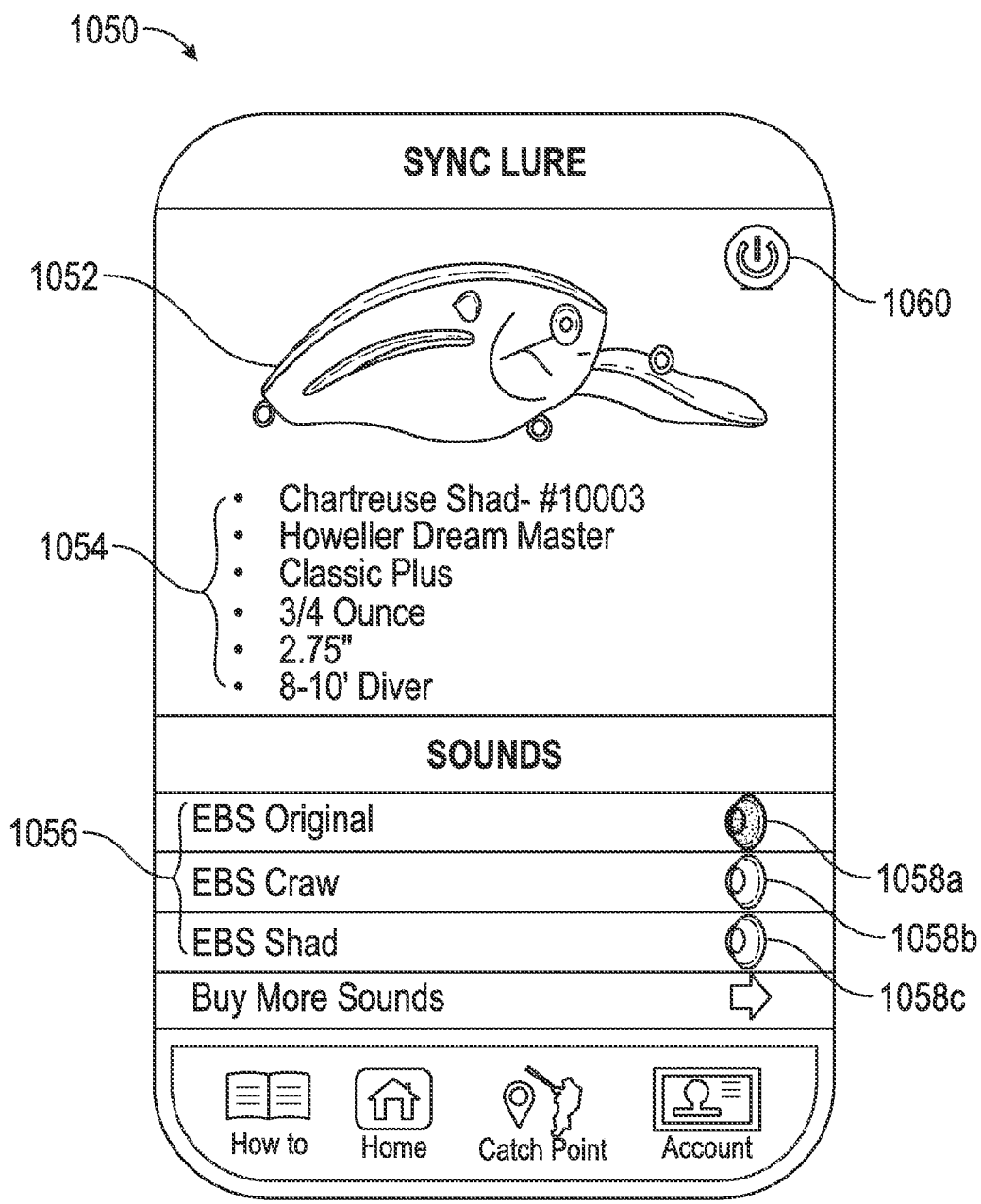

FIG. 10B depicts a visualization of a second screen 1050 of the application, according to one or more embodiments. As depicted, the second screen 1050 is representative of the synchronization function 1006 of FIG. 10A. Thus, the second screen 1050 depicts a picture 1052 of the actual lure being used, along with various lure characteristics 1054. Moreover, the second screen 1050 enables selection of one or more sounds 1056 to be configured to the lure upon synchronization (either by download of the sound or of an associated key as described above). The second screen 1050 may additionally include indicators 1058*a-c* (depicted as a first indicator 1058*a*, second indicator 1058*b*, and third indicator 1058*c*) which may change appearance (color, shape, etc.) to illustrate whether or not the associated sound is downloaded or has synchronized with the lure. As depicted, the "EBS Original" sound is synchronized as indicated by the first indicator 1058*a*, but the other sounds are not synchronized. The second screen 1050 also includes a power function 1060 for controlling whether the lure is on or off.

It will be appreciated that a variety of functions as known to those skilled in the art but not discussed may be employed and are contemplated herein.

Figure 11A:
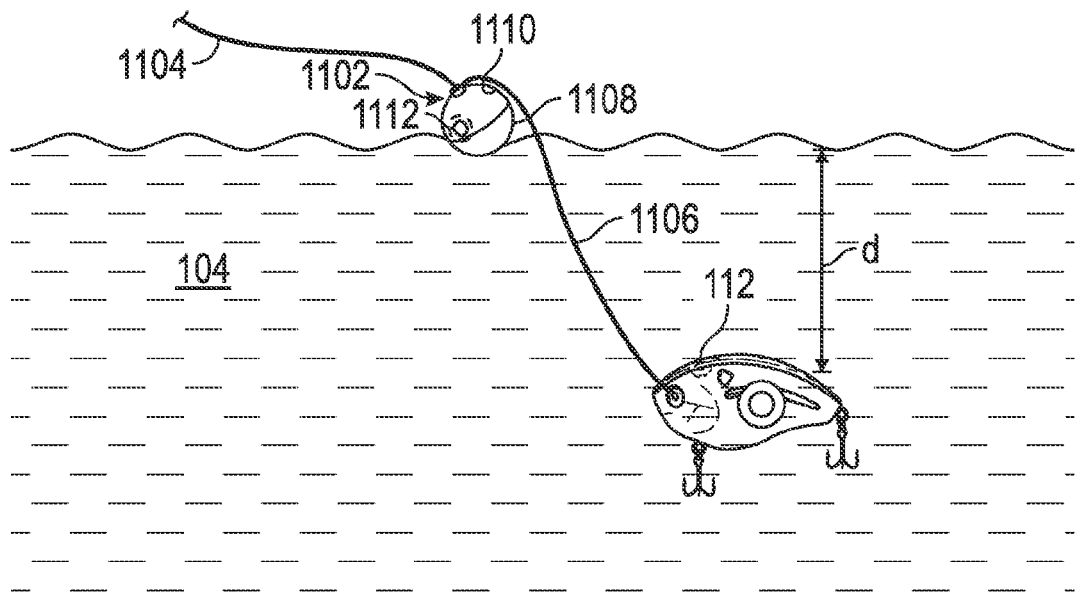
FIGS. 11A-11C depict a floating bobber which generates aquatic sounds, according to one or more embodiments.
Figure 11B:
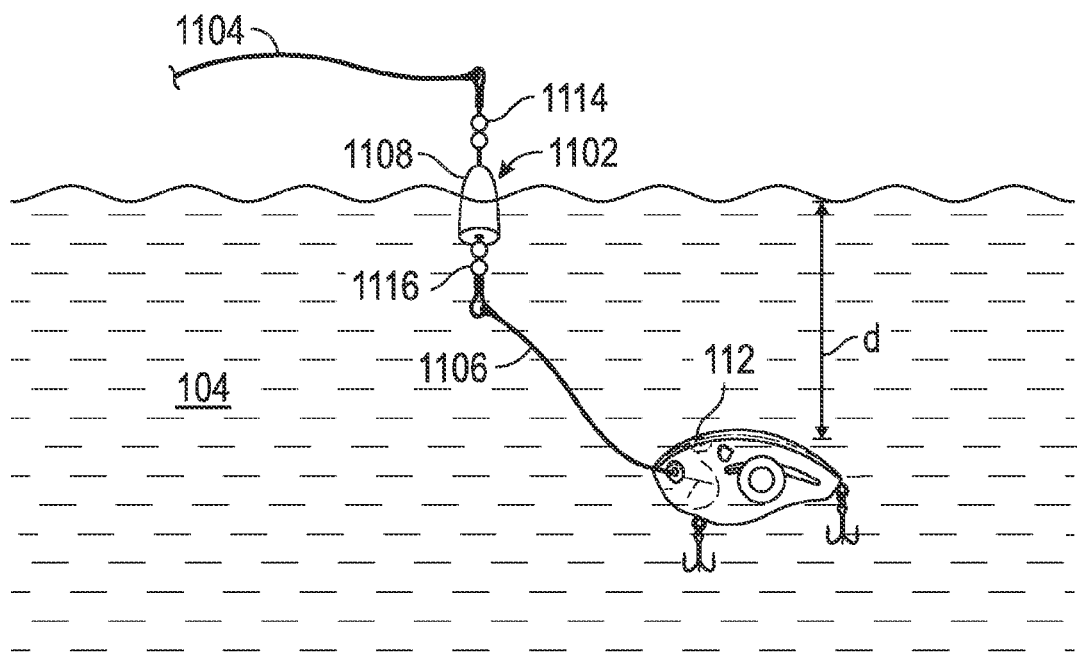
Figure 11C:
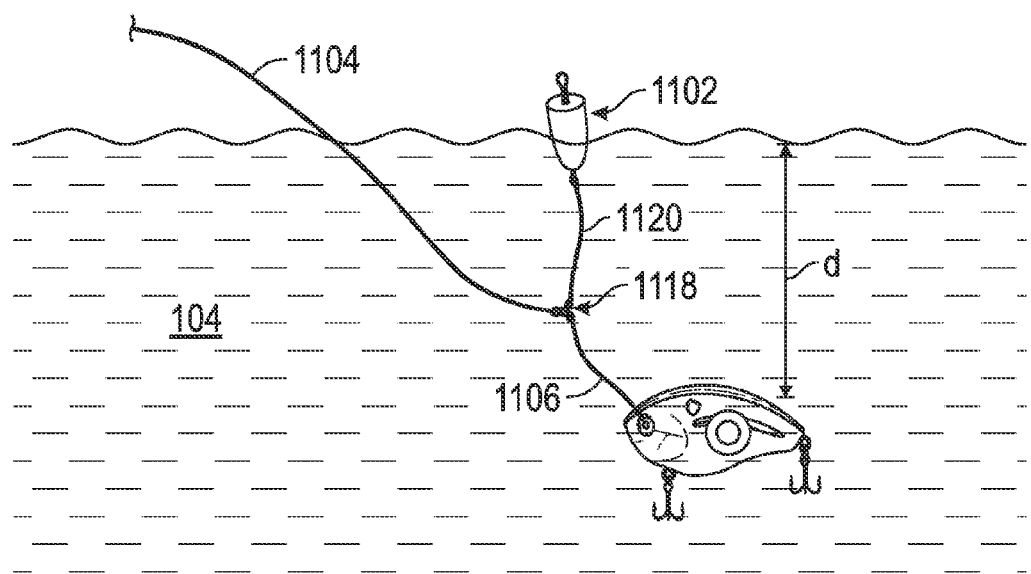

FIGS. 11A-11C depict a floating bobber 1102 for use while fishing which generates aquatic sounds, according to one or more embodiments. In one embodiment, as depicted, the floating bobber 1102 is partially floating within a body of water 104 and is coupled to a fishing pole via a first fishing line 1104 and further coupled to the fishing lure 112 via a second fishing line 1106. In some embodiments, the first fishing line 1104 and the second fishing line 1106 may be the same fishing line. In any event, due to the floating bobber 1102 being coupled with both the fishing pole and the fishing lure 112, the floating bobber 1102 and the fishing lure 112 are typically cast together. The second fishing line 1106 may be a particular length, thereby enabling the fishing lure 112 to reside a predetermined depth d below the surface of the water 104, which may be advantageous to catching a particular type of fish. One of skill in the art will appreciate that, in some embodiments, the fishing lure 112 may be live bait, cut bait, worms, and/or artificial fishing lures.

The floating bobber 1102 is comprised of a floating bobber body 1108 having a hollow body interior 1110, thus capable of floating on or near the surface of the water 104. The floating bobber 1102 includes an electronic circuit (detailed below in FIG. 11B) within the body interior 1110, the electronic circuit having a speaker 1108 for emitting one or more aquatic sounds, including sounds resembling the prey of a fish, thereby attracting fish to the area near the floating bobber 1102 and the fishing lure 112. The sounds emitting from the speaker 1108 may work in conjunction with any sounds emitting from the fishing lure 112 to attract predatory fish.

FIGS. 11B and 11C depict various embodiments of the floating bobber 1102. For example, FIG. 11B depicts a floating bobber 1102 of the type typically referred to as a "popping cork" by those skilled in the art. Such an embodiment typically includes a plurality of top beads 1114 (e.g., plastic beads) arranged above the floating bobber body 1108, and additional plurality of bottom beads 1116 arranged therebelow, where the bottom beads 1116 are heavier than the top beads 1114, thereby creating noises and jerking the fishing lure 112 in a movement resembling fish prey. FIG. 11C depicts an embodiment having a "3-way swivel" 1118 as known to those skilled in the art which couples together the first fishing line 1104 from the fishing pole, the second fishing line 1106 to the fishing lure 112, and a third fishing line 1120 to the floating bobber 1102. However, regardless of the floating bobber 1102 type or configuration as depicted in FIGS. 11A-C, or any other configuration known to those skilled in the art, the floating bobber 1102 assists and attracts predatory fish by emitting sound from the speaker 1108 arranged therein.

Figure 12:
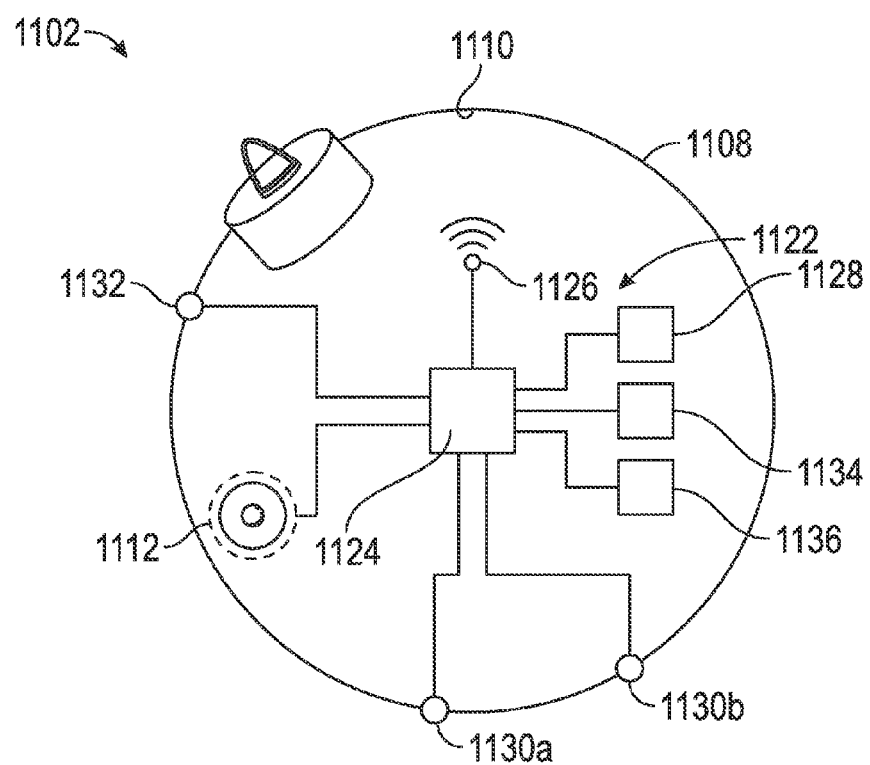
FIG. 12 depicts a schematic diagram of an electronic circuit of the floating bobber, according to one or more embodiments.

FIG. 12 depicts a schematic diagram of an electronic circuit 1122 of the floating bobber 1102, according to one or more embodiments. The electronic circuit 1122 includes a controller 1124 having a memory (not shown) capable of storing one or more aquatic sounds, including but not limited to sounds resembling the prey of a fish. The controller 1124 is operationally coupled to the speaker 1112 which emits the one or more sounds, thereby attracting predatory fish to the area near the floating bobber 1102 and fishing lure 112. The sounds may be stored on the memory of the controller 1124 at the time of manufacturing or may alternatively be downloaded to the controller 1124 by an angler via a floating bobber communication means which may employ a variety of technologies. Such technologies may include, for example, wire transfer (e.g., a USB, mini-USB, micro-usb connection, or the like) or wireless transfer (e.g., near-field communication, Bluetooth, WIFI, RF, cellular network communications, and the like), as depicted, via a wireless transceiver 1126 operationally coupled to the controller 1124 and capable of both sending and receiving information. The controller 1124, speaker 1112, and/or wireless transceiver 1126 are powered, either individually or in combination, by one or more power sources 1128.

The speaker 1112 may be activated via activation means, thereby emitting one of the sounds stored on the controller 1124 memory. One exemplary activation means, as depicted, includes employing electrodes 1130*a,b* (depicted as a first electrode 1130*a* and a second electrode 1130*b*), wherein the electrodes 1130*a,b* are arranged such that they become electrically coupled via water when the floating bobber 1102 is arranged within the body of water 104. Advantageously, this automatically begins emission of sound from the speaker 112 when the floating bobber 1102 is arranged within the water and stops emission of such when the floating bobber 1102 is removed from the water, thereby preserving the power source 1128 when not in use.

The floating bobber 1102 further includes a control means operationally coupled to the controller 1124 for changing which of the one or more sounds is generated by the speaker 1112. For example, and as depicted, the control means is an electrode 1132. Activation of the electrode 1132, for example by physical touch, sends a signal to the controller 1124, thereby changing which of the sounds is to be generated by the speaker 1112. In other embodiments, the control means may be a mobile device (not depicted) having an application running thereon which communicates with the floating bobber 1102 via the floating bobber communications means (e.g., the wireless transceiver 1126), thereby enabling wireless control of the floating bobber 1102 and which song is generated by the speaker 1112.

In other embodiments, the floating bobber 1102 further includes non-aqueous ambient condition monitoring means 1134 operationally coupled to the controller 1124. The non-aqueous ambient condition monitoring means 1134 may be capable of obtaining non-aqueous measurements, for example and without limitation, air temperature and barometric pressure. In further embodiments, the floating bobber 1102 further includes aqueous ambient condition monitoring means 1136 operationally coupled to the controller 1124. The aqueous ambient condition monitoring means 1136 may be capable of obtaining aqueous measurements, for example and without limitation, water temperature, turbidity, water pH, oxygen level, and the like. Such aqueous and non-aqueous measurements may be communicated back to the angler via the communication means, including real-time (or near-real-time) transmission of such measurements via the wireless transceiver 1126.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") is closed herein is to be understood to set forth every number and range encompassed within the broader range of values.

Also, the terms in the claims have their plain, ordinary meaning unless otherwise explicitly and clearly defined by the patentee. Moreover, the articles "a" or "an," as used in the claims, are defined herein to mean one or more than one of the element that it introduces. As used herein the term "and/or" and "/" includes any and all combinations of one or more of the associated listed items. While compositions and methods are described in terms of "comprising," "containing," or "including" various components or steps, the compositions and methods can also "consist essentially of" or "consist of" the various components and steps.

It will be understood that the sizes and relative orientations of the illustrated elements are not shown to scale, and in some instances they have been reduced or exaggerated for purposes of explanation. Additionally, if there is any conflict in the usages of a word or term in this specification and one or more patent or other documents that may be incorporated herein by reference, the definitions that are consistent with this specification should be adopted.

What is claimed is:

1. An automated fish culling system, comprising:
    a base station comprising:
        a processor;
        a base station display configured to display information corresponding to a plurality of cull tags, said base station display being communicably coupled to said processor, one cull tag of said plurality of cull tags being configured to be associated with one fish, wherein said one cull tag attaches to said one fish via a net which encompasses said one fish thereby enabling said one fish to freely swim therein and enabling liquid to pass therethrough, each cull tag of said plurality of cull tags comprising an electronic cull tag identifier, said each cull tag being communicably coupled wirelessly to said base station, wherein said each cull tag being configured to receive a signal from said base station, and wherein said signal activates said electronic cull tag identifier of said each cull tag; and
        a memory for storing data comprising information associated with said one fish, said information comprising at least the weight of said one fish,
    wherein said processor determines a fish to cull based on at least said weight of said one fish and indicates said fish to cull via at least said base station display.

2. The system of claim 1, further comprising a database configured to remotely store and retrieve data comprising information associated with said one fish, and wherein said database is communicably coupled to said base station.

3. The system of claim 1, further comprising a global positioning system (GPS) for obtaining and reporting a GPS position, wherein said GPS position is associated with said one fish.

4. The system of claim 3, wherein said GPS is arranged within said base station.

5. The system of claim 1, wherein said base station further comprises a speaker communicably coupled to said processor, wherein said processor further indicates said fish to cull via an audible sound from said speaker.

6. The system of claim 1, wherein said base station display comprises a plurality of light emitting diodes (LEDs), one LED of said plurality of LEDs being associated with one said each cull tag as an indicator LED, and wherein said processor indicates said fish to cull by activating one said indicator LED.

7. The system of claim 1, wherein said base station display comprises a digital display screen which displays information associated with said one fish.

8. The system of claim 1, wherein said base station wirelessly communicates said signal to said one cull tag.

9. The system of claim 8, wherein said electronic cull tag identifier of said one cull tag comprises a cull tag LED, and wherein said fish to cull is indicated by said base station activating said cull tag LED via said signal.

10. The system of claim 9, wherein said cull tag LED is a multi-color LED, and wherein said signal controls which color said cull tag LED emits based on said fish to cull.

11. The system of claim 1, wherein said electronic cull tag identifier of said one cull tag is configured to display said information associated with said one fish.

12. The system of claim 11, wherein said information comprises said fish weight and a GPS position associated with said one fish.

13. The system of claim 1, further comprising an electronic fish weighing system that generates said fish weight and is communicably coupled to said base station.

14. The system of claim 13, further comprising an electronic fish length measurement system that generates a fish length, wherein said determination of said fish to cull is further based on said fish length.

15. The system of claim 1, further comprising an application running on a mobile device having a mobile device display screen and communicably coupled to said base station, wherein said application indicates said fish to cull via said mobile device display screen.

16. A method for automated fish culling, comprising:
associating one cull tag of a plurality of cull tags with one fish, wherein each cull tag of said plurality of cull tags comprises an electronic cull tag identifier; attaching said one cull tag to said one fish via encompassing said one fish with a net having said one cull tag coupled thereto, thereby enabling said fish to feely swim therein and enabling liquid to pass therethrough;
displaying information corresponding to said each cull tag with a base station display of a base station, said base station further comprising:
a processor communicably coupled to said base station display;
storing information associated with said one fish in a memory, said information comprising at least the weight of said one fish;
determining a fish to cull with said processor based on at least said weight stored in said memory;
wirelessly communicating a signal from said base station to said one cull tag, wherein said signal activates said electronic cull tag identifier of said one cull tag; and
indicating said fish to cull via said base station display.

17. The method of claim 16, further comprising obtaining and reporting a global positioning system (GPS) position with a GPS and associating said GPS position with said one fish.

18. The method of claim 16, further comprising indicating said fish to cull via an audible sound from a speaker of said base station, said speaker being communicably coupled to said processor.

19. The method of claim 16, wherein said base station display comprises a plurality of light emitting diodes (LEDs), one LED of said plurality of LEDs being associated with said one cull tag as an indicator LED, the method further comprising indicating said fish to cull via said processor activating said indicator LED.

20. The method of claim 16, wherein said base station display comprises a digital display screen which displays information about said one fish associated with said one cull tag.

21. The method of claim 16, wherein said electronic cull tag identifier of said one cull tag comprises a cull tag LED, and wherein said signal activates said cull tag LED of said one each cull tag.

22. The method of claim 21, wherein said cull tag LED is multi-colored, and wherein said signal controls which color said cull tag LED emits based on said fish to cull.

23. The method of claim 16, further comprising indicating information associated with said one fish on said electronic cull tag identifier.

24. The method of claim 23, wherein said information comprises said weight and a global positioning system (GPS) position associated with said one fish.

25. The method of claim 16, further comprising weighing a fish with an electronic fish weighing system that generates said fish weight and is communicably coupled to said base station.

26. The method of claim 25, further comprising measuring a fish length of said one fish with a fish length measurement system, wherein said determination of said fish to cull is further based on said fish length.

27. The method of claim 16, further comprising indicating said fish to cull via a mobile device display screen of a mobile device having an application running thereon and communicably coupled to said base station.

* * * * *